United States Patent
Jung et al.

(10) Patent No.: US 12,490,229 B2
(45) Date of Patent: Dec. 2, 2025

(54) METHOD AND DEVICE FOR TRANSMITTING USER DATA THROUGH RANDOM ACCESS RESPONSE MESSAGE IN MOBILE COMMUNICATION SYSTEM

(71) Applicant: Samsung Electronics Co., Ltd., Suwon-si (KR)

(72) Inventors: Sangyeob Jung, Suwon-si (KR); Sangbum Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/626,258

(22) Filed: Apr. 3, 2024

(65) Prior Publication Data

US 2024/0251451 A1 Jul. 25, 2024

Related U.S. Application Data

(63) Continuation of application No. 17/309,518, filed as application No. PCT/KR2019/017181 on Dec. 6, 2019, now abandoned.

(30) Foreign Application Priority Data

Dec. 6, 2018 (KR) .................. 10-2018-0156299
Jun. 26, 2019 (KR) .................. 10-2019-0076660

(51) Int. Cl.
*H04W 74/0833* (2024.01)
*H04W 68/00* (2009.01)
(Continued)

(52) U.S. Cl.
CPC ......... *H04W 68/005* (2013.01); *H04W 72/23* (2023.01); *H04W 74/0838* (2024.01)

(58) Field of Classification Search
None
See application file for complete search history.

(56) References Cited

U.S. PATENT DOCUMENTS 10,433,342 B2    10/2019   Akkarakaran et al.
11,356,877 B2 *   6/2022   Li .................. H04B 7/0417
(Continued)

FOREIGN PATENT DOCUMENTS

KR    10-2019-0116885 A    10/2019
WO       2018075256 A1      4/2018
WO       2018174595 A1      9/2018

OTHER PUBLICATIONS

International Search Report and Written Opinion of the International Searching Authority dated Mar. 20, 2020 in connection with International Application No. PCT/KR2019/017181, 11 pages.

(Continued)

*Primary Examiner* — Steve R Young

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method and a device for efficiently transmitting user data through a random access response message in a mobile communication system.

2 Claims, 28 Drawing Sheets

(51) Int. Cl.
*H04W 72/23* (2023.01)
*H04W 74/0838* (2024.01)

(56) References Cited

U.S. PATENT DOCUMENTS

| | | | |
|---|---|---|---|
| 11,882,496 B2* | 1/2024 | Kim | H04W 36/00838 |
| 2018/0352461 A1* | 12/2018 | Guirguis | H04W 36/302 |
| 2019/0215872 A1 | 7/2019 | Park et al. | |
| 2020/0021336 A1* | 1/2020 | Da Silva | H04W 36/0085 |
| 2020/0344660 A1* | 10/2020 | Xie | H04W 36/302 |
| 2020/0367081 A1* | 11/2020 | Shi | H04W 72/02 |
| 2021/0099940 A1* | 4/2021 | Shen | H04W 36/0085 |
| 2021/0235296 A1* | 7/2021 | Kim | H04B 7/0632 |
| 2021/0400715 A1 | 12/2021 | Pham Van et al. | |

OTHER PUBLICATIONS

Intel Corporation, "Early data transmission discussion for eFeMTC and FeNB-IOT," R2-1712639, 3GPP TSG RAN WG2 Meeting #100, Reno, USA, Nov. 27-Dec. 1, 2017, 4 pages.
Mediatek Inc., "Mobile terminated Early Data Transmission," R2-1815372, 3GPP TSG RAN WG2, Meeting #103bis, Chengdu, China, Oct. 8-12, 2018, 6 pages.
Qualcomm Incorporated, "MT initiated DL EDT," R2-1817910 Revision of R2-1814037, 3GPP TSG RAN WG2 Meeting, #104, Spokane, USA, Nov. 12-16, 2018, 8 pages.
Office Action dated May 9, 2025, in connection with Korean Application No. 10-2019-0076660, 8 pages.

* cited by examiner

FIG. 1E
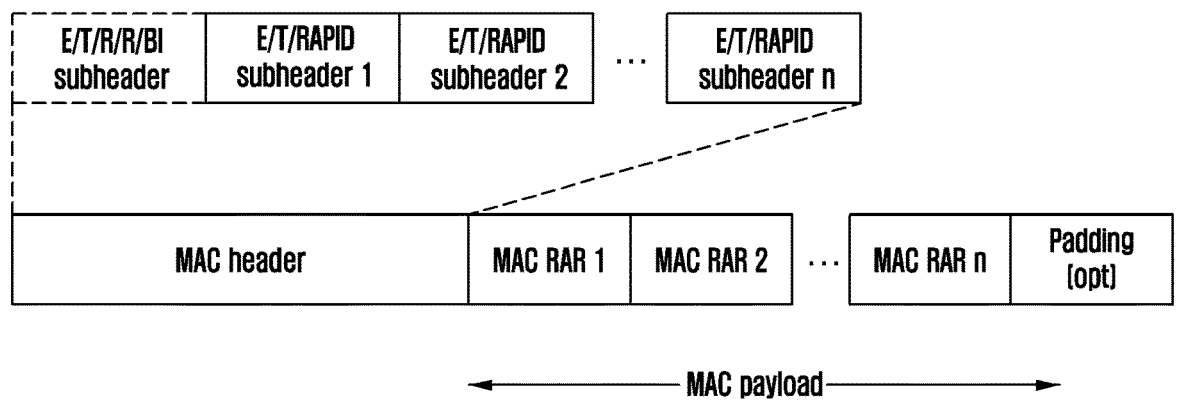
EXAMPLE OF MAC PDU INCLUDING MAC RARS
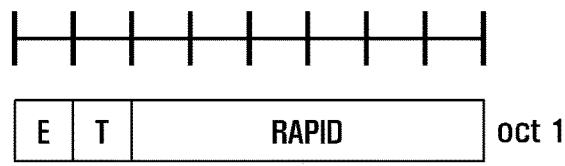
E/T/RAPID MAC SUBHEADER
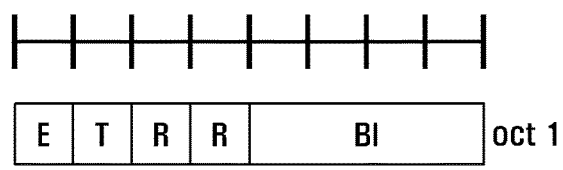
E/T/R/R/BI MAC SUBHEADER
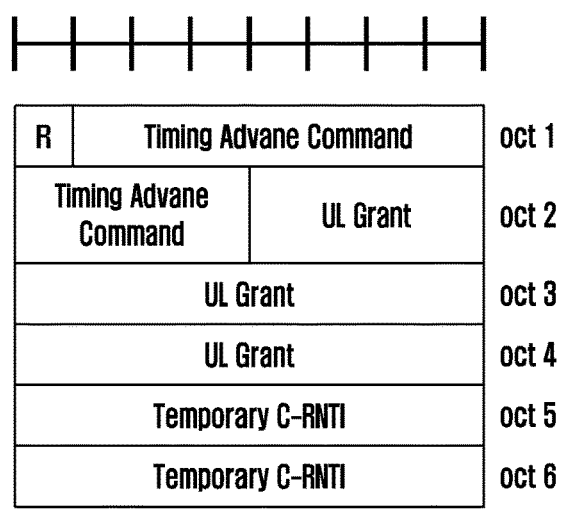
(d) MAC RAR

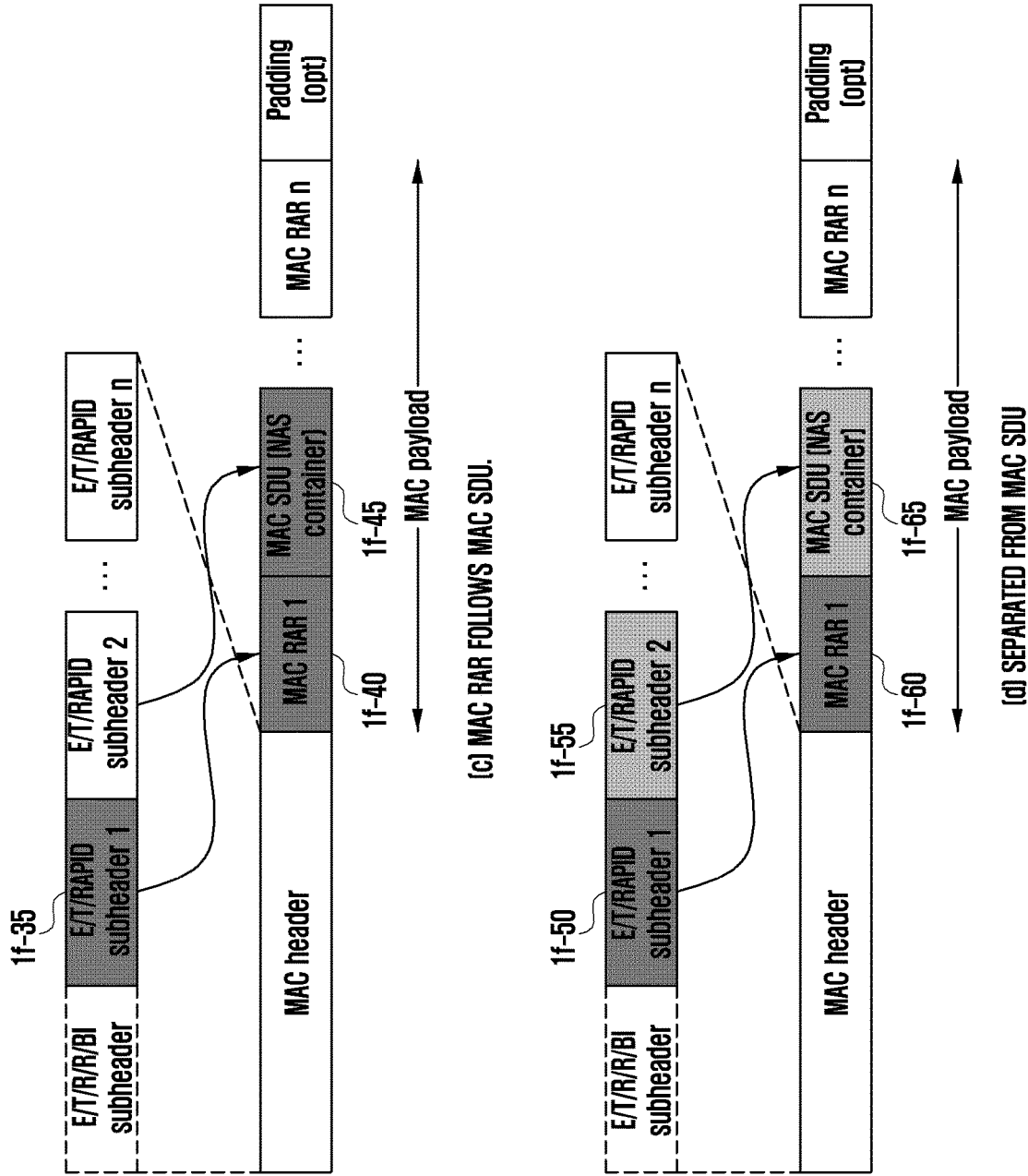

E/T/RAPID/L MAC subheader

MAC RAR with configurable length

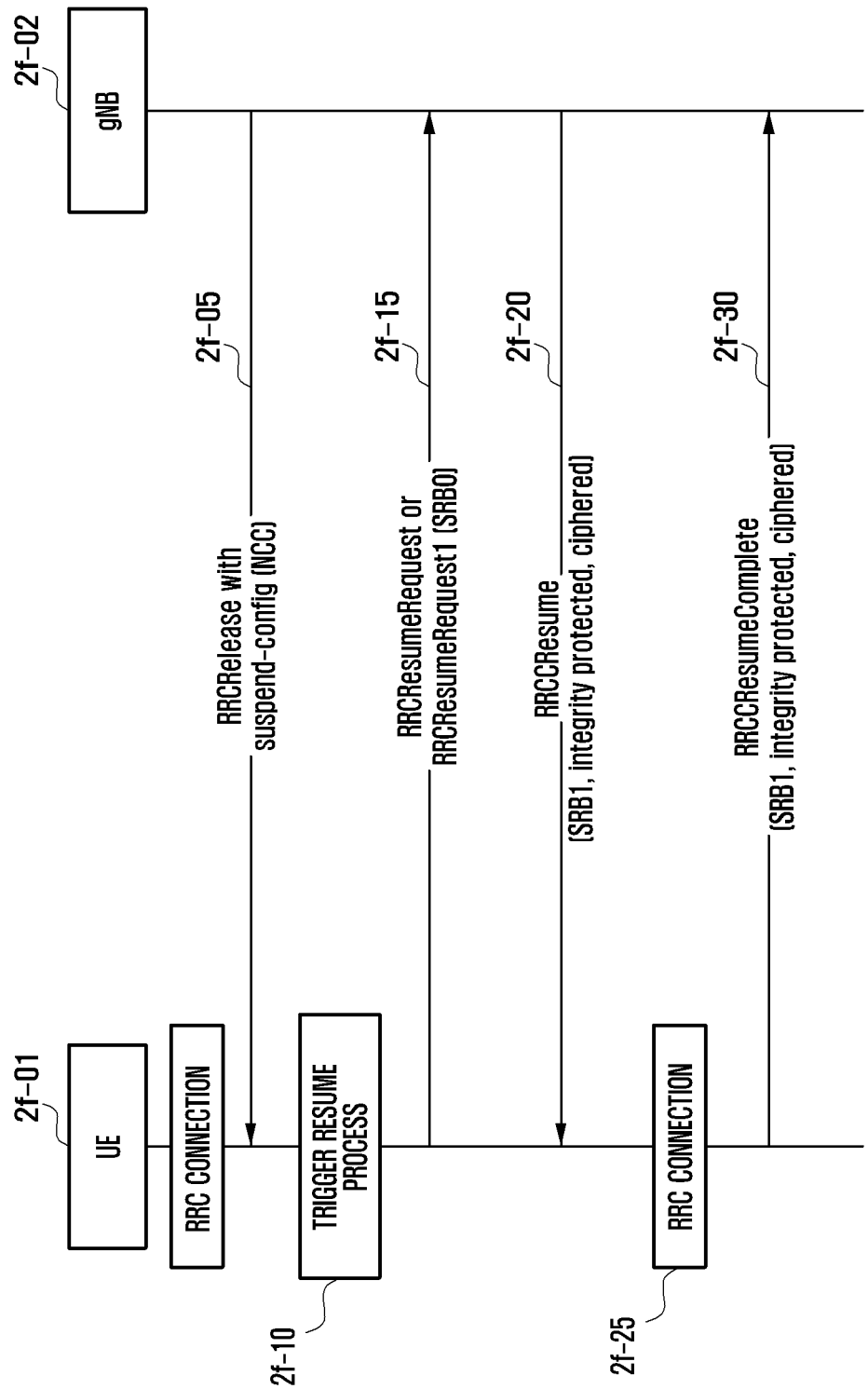

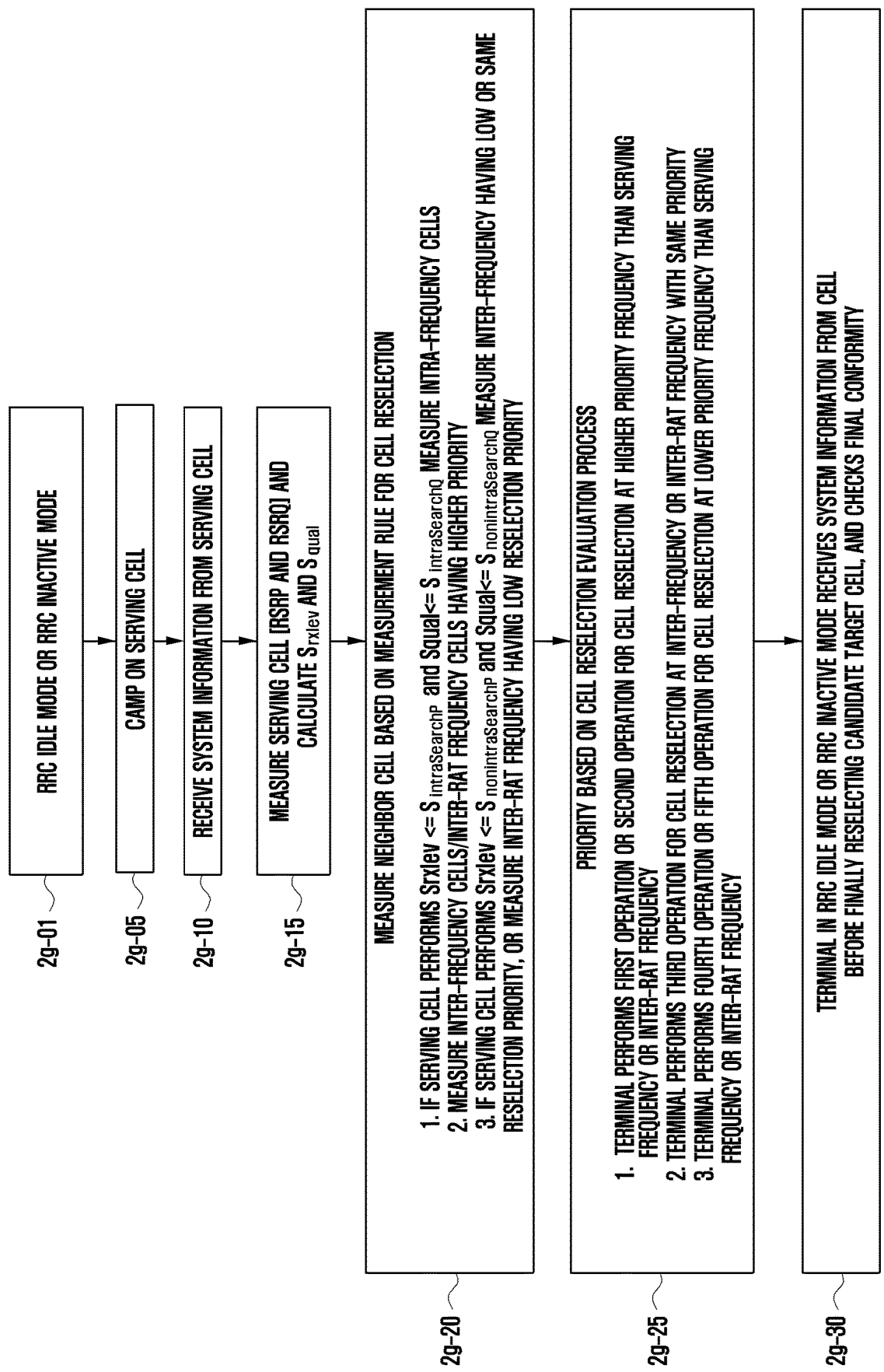

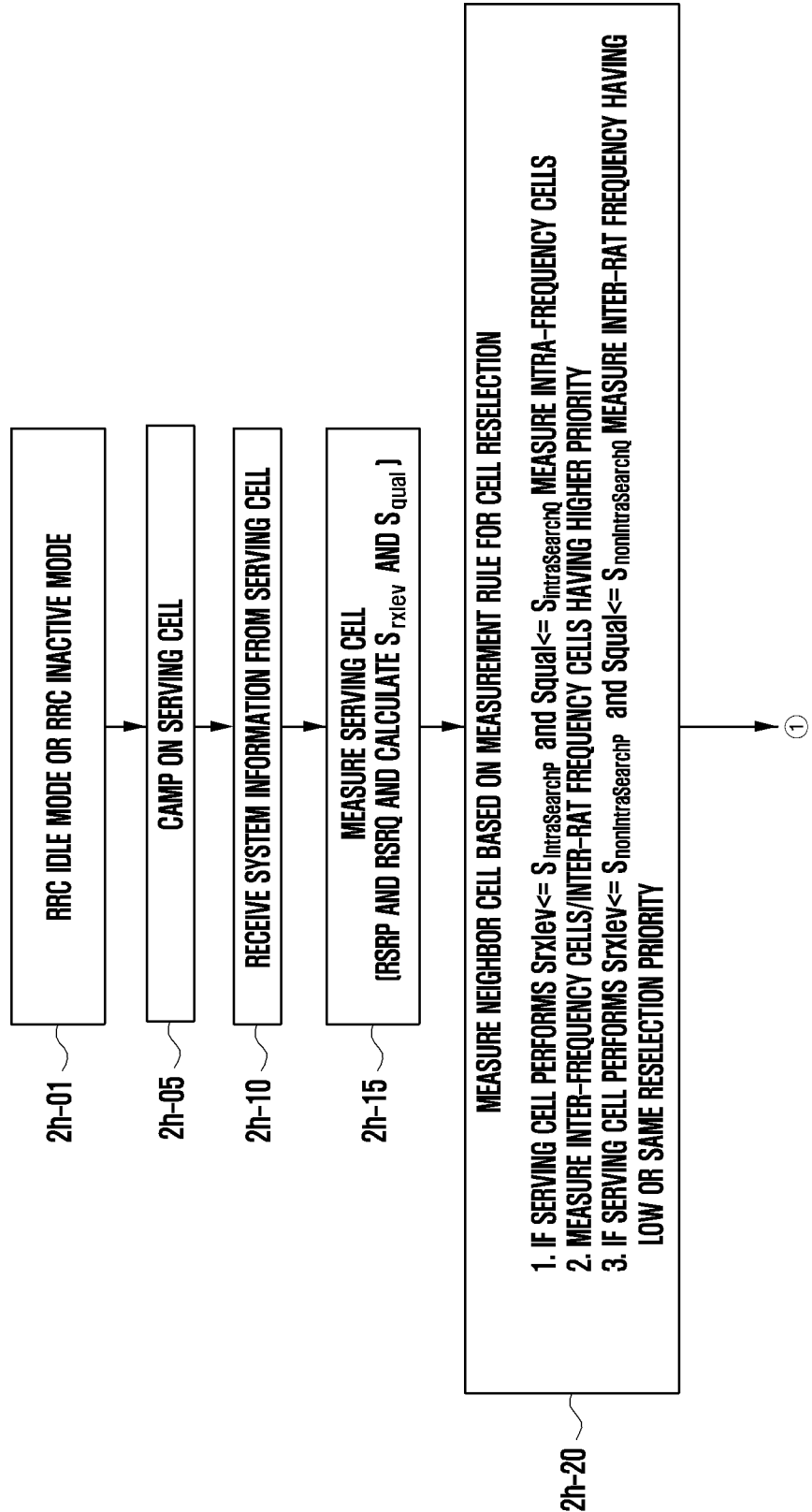

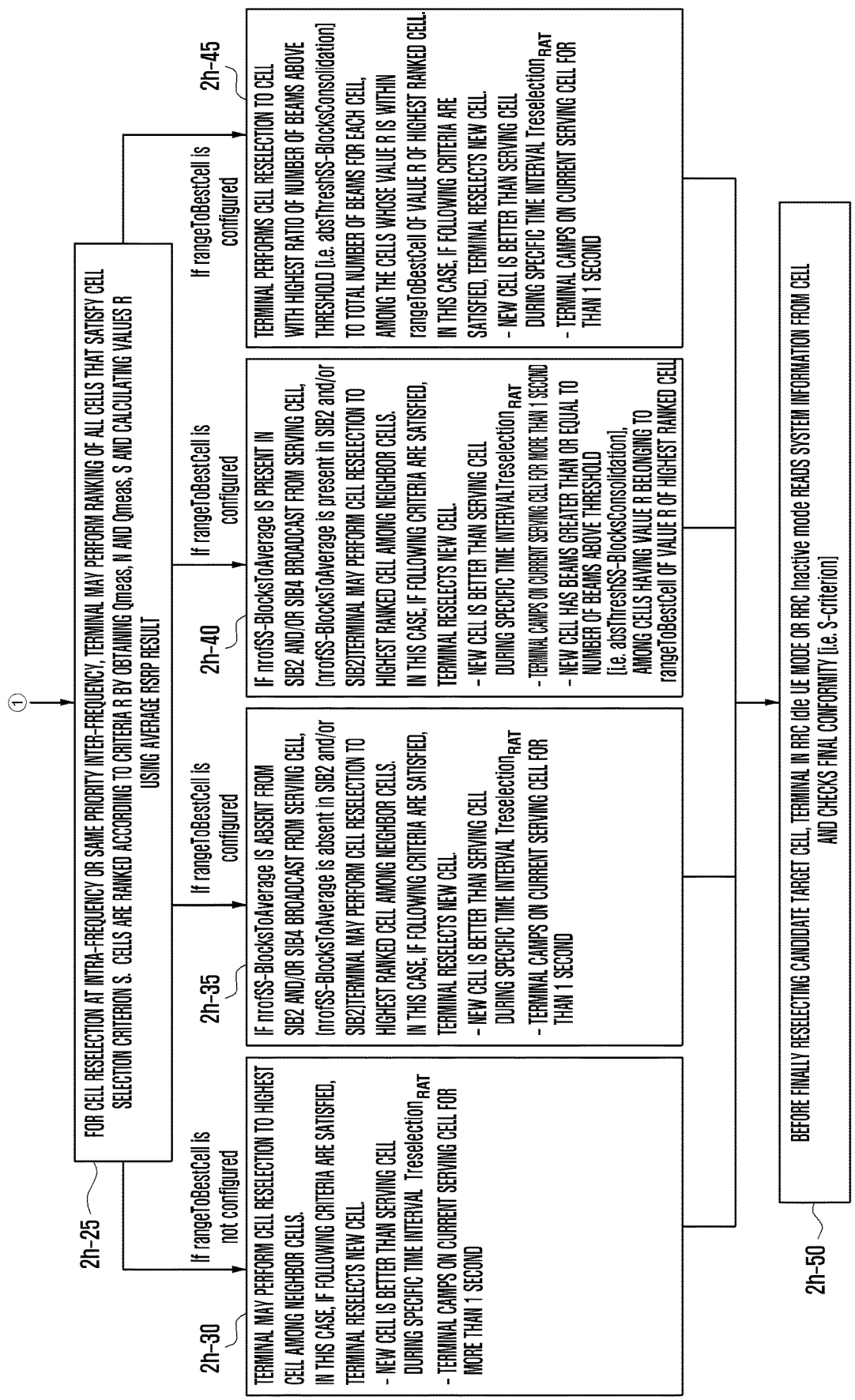

METHOD AND DEVICE FOR TRANSMITTING USER DATA THROUGH RANDOM ACCESS RESPONSE MESSAGE IN MOBILE COMMUNICATION SYSTEM

CROSS-REFERENCE TO RELATED APPLICATIONS

This application is a continuation of application Ser. No. 17/309,518, which is a 371 National Stage of International Application No. PCT/KR2019/017181, filed Dec. 6, 2019, which claims priority to Korean Patent Application No. 10-2018-0156299, filed Dec. 6, 2018, and Korean Patent Application No. 10-2019-0076660, filed Jun. 26, 2019, the disclosures of which are herein incorporated by reference in their entirety.

BACKGROUND

1. Field

The disclosure relates to a method and a device for efficiently transmitting user data through a random access response message in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In line with the recent development of mobile communication systems, there is a need for a method and a device for efficiently transmitting user data through a random access response message. In addition, a method and a device for efficiently performing cell reselection of a terminal according to the same frequency priority are required in a mobile communication system.

SUMMARY

The disclosure proposes a method and a device for efficiently transmitting user data through a random access response message in a mobile communication system.

In addition, the disclosure proposes a method and a device for efficiently performing cell reselection of a terminal according to the same frequency priority in a mobile communication system.

In order to solve the problems described above, the disclosure provides a method of processing a control signal in a wireless communication system, which includes: receiving a first control signal transmitted from a base station; processing the received first control signal; and transmitting a second control signal generated based on the processing to the base station.

In order to solve the problems described above, the disclosure provides a method of operating a terminal in a wireless communication system, which includes: receiving a paging message including a dedicated preamble from a base station; transmitting the dedicated preamble to the base station, based on the paging message; receiving a random access response (RAR) message from the base station, based on the dedicated preamble; if there is user data related to downlink early data transmission (DL EDT) in a non-access-stratum (NAS) container included in the received RAR message, decoding the user data from the NAS container; and inserting the user data into the msg3 and transmitting the same to the base station.

In some embodiments, the method further includes transmitting, to the base station, UE capability information including an indicator indicating whether or not to support DL EDT using RAR.

In some embodiments, the method further includes receiving a physical downlink control channel (PDCCH) to which a separate radio network temporary identity (RNTI) is applied, and the separate RNTI indicates that the paging message is configured as only the user data related to DL EDT.

In some embodiments, a subheader related to the DL EDT, which is included in the RAR message, is located after subheaders that are not related to the DL EDT.

In another embodiment of the disclosure, a method of operating a base station in a wireless communication system includes: receiving a paging including user data from a mobility management entity (MME); transmitting a paging message including a dedicated preamble to a terminal; receiving the dedicated preamble from the terminal, based on the paging message; transmitting a random access response (RAR) message to the terminal, based on the dedicated preamble; and receiving msg3 from the terminal, wherein if there is user data related to downlink early data transmission (DL EDT) in a non-access-stratum (NAS) container included in the RAR message, the user data is decoded by the terminal, and wherein the decoded user data is inserted into the msg3.

In another embodiment of the disclosure, a terminal includes: a transceiver capable of transmitting and receiving at least one signal; and a controller connected to the transceiver, wherein the controller is configured to receive a paging message including a dedicated preamble from a base station, transmit the dedicated preamble to the base station, based on the paging message, receive a random access response (RAR) message from the base station, based on the dedicated preamble, if there is user data related to downlink early data transmission (DL EDT) in a non-access-stratum (NAS) container included in the received RAR message, decode the user data from the NAS container, insert the user data into the msg3, and transmit the same to the base station.

In another embodiment of the disclosure, a base station includes: a transceiver capable of transmitting and receiving at least one signal; and a controller connected to the transceiver, wherein the controller is configured to receive a paging including user data from a mobility management entity (MME), transmit a paging message including a dedicated preamble to a terminal, receive the dedicated preamble from the terminal, based on the paging message, transmit a random access response (RAR) message to the terminal, based on the dedicated preamble, and receive msg3 from the terminal, wherein if there is user data related to downlink early data transmission (DL EDT) in a non-access-stratum (NAS) container included in the RAR message, the user data is decoded by the terminal, and wherein the decoded user data is inserted into the msg3.

According to an embodiment of the disclosure, it is possible to efficiently transmit user data through a random access response message in a mobile communication system.

According to another embodiment of the disclosure, it is possible to efficiently perform cell reselection of a terminal according to the same frequency priority in a mobile communication system.

BRIEF DESCRIPTION OF THE DRAWINGS

FIG. 1E is a diagram illustrating the configuration of a random access response message that does not contain user data in the disclosure.

FIG. 1O is a flowchart illustrating the operation of a terminal in the disclosure.

FIG. 2F is a diagram illustrating a procedure in which a base station releases a connection of a terminal so that the terminal switches from an RRC connected mode to an RRC inactive mode and a procedure in which a terminal establishes a connection with a base station to then switch from an RRC inactive mode to an RRC connected mode according to an embodiment of the disclosure.

FIG. 2G is a diagram illustrating a process of reselecting a cell when a terminal is in an RRC idle mode or an RRC inactive mode according to an embodiment of the disclosure.

FIGS. 2HA and 2HB are diagrams illustrating a process of reselecting an intra-frequency/inter-frequency cell having the same priority as the frequency of a serving cell when a terminal is in an RRC idle mode or an RRC inactive mode according to an embodiment of the disclosure.

DETAILED DESCRIPTION

Figure 1A:
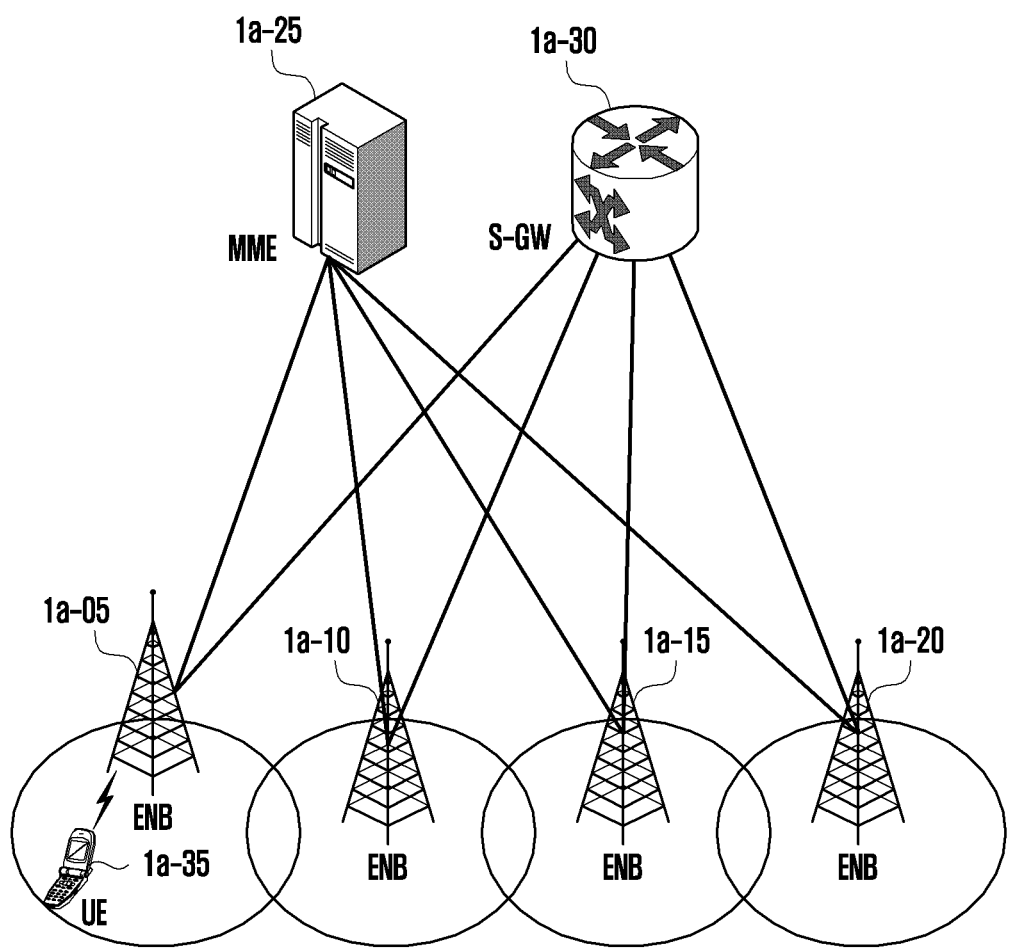
FIG. 1A is a diagram illustrating the structure of an LTE system to which the disclosure is applied.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

In the following description of the disclosure, a detailed description of known functions or configurations incorporated herein will be omitted when it may make the subject matter of the disclosure unnecessarily unclear. Hereinafter, embodiments of the disclosure will be described with reference to the accompanying drawings. Although the disclosure is provided based on an LTE system, the disclosure may also be applied to other mobile communication systems such as NR, which is a next-generation mobile communication system, and the like. For example, in the disclosure, an evolved NodeB (eNB) in LTE corresponds to a next-generation NodeB (gNB) in NR, and a mobility management entity (MME) in LTE corresponds to an access management function (AMF) in NR.

FIG. 1A is a diagram illustrating the structure of an LTE system to which the disclosure is applied.

Referring to FIG. 1A, a radio access network of an LTE system includes Evolved Node Bs (hereinafter referred to as "ENBs", "Node Bs", or "base stations") 1a-05, 1a-10, 1a-15, and 1a-20, a mobility management entity (MME) 1a-25, and a serving-gateway (S-GW) 1a-30, as shown in the drawing. User equipment (hereinafter referred to as "UE" or "terminal") 1a-35 accesses an external network through the ENBs 1a-05 to 1a-20 and the S-GW 1a-30.

In FIG. 1A, the ENBs 1a-05 to 1a-20 correspond to existing node Bs in a UMTS system. The ENB is connected to the UE 1a-35 through a wireless channel and performs a more complex role than the existing node B. In the LTE system, since all user traffic including real-time services, such as VoIP (Voice over IP) through Internet protocol, is served through a shared channel, a device for collecting status information, such as buffer status, available transmission power status, channel status, and the like of UEs, and performing scheduling is required, and the ENBs 1a-05 to 1a-20 serve as such a device. One ENB typically controls multiple cells. For example, in order to realize a data rate of 100 Mbps, the LTE system uses, as radio access technology, orthogonal frequency division multiplexing (hereinafter referred to as "OFDM") in a bandwidth of, for example, 20 MHz. In addition, an adaptive modulation and coding (hereinafter referred to as "AMC") scheme is applied to determine a modulation scheme and a channel coding rate in accordance with the channel status of a terminal. The S-GW 1a-30 is a device for providing data bearers and generates or removes data bearers under the control of the MME 1a-25. The MME is a device that performs various control functions, as well as a mobility management function for a terminal, and is connected to a plurality of base stations.

Figure 1B:
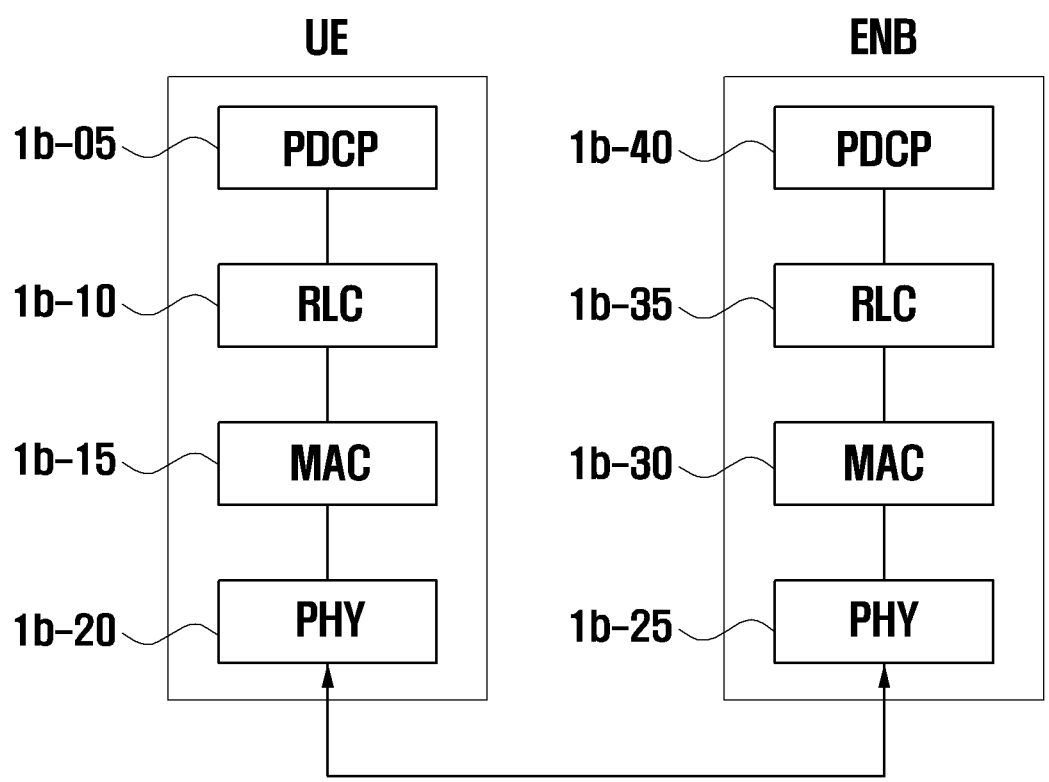
FIG. 1B is a diagram illustrating a radio protocol structure in an LTE system to which the disclosure is applied.

FIG. 1B is a diagram illustrating a radio protocol structure in an LTE system to which the disclosure is applied.

Referring to FIG. 1B, the radio protocol of the LTE system includes a packet data convergence protocol (PDCP) 1b-05 or 1b-40, a radio link control (RLC) 1b-10 or 1b-35, and a medium access control (MAC) 1b-15 or 1b-30 in a terminal and an ENB, respectively. The packet data convergence protocol (PDCP) 1b-05 or 1b-40 performs operations, such as IP header compression/decompression and the like, and the radio link control (hereinafter referred to as "RLC") 1b-10 or 1b-35 reconfigures a PDCP packet data unit (PDU) to an appropriate size and performs an ARQ operation and the like. The MAC 1b-15 or 1b-30 is connected to a plurality of RLC entities configured in a single terminal and performs operation of multiplexing RLC PDUs into MAC PDUs and demultiplexing RLC PDUs from MAC PDUs. A physical layer 1b-20 or 1b-25 channel-codes and modulates upper layer data, and converts the same into OFDM symbols to then be transmitted through a wireless channel, or demodulates OFDM symbols received through a wireless channel and channel-decodes the same to then be transmitted to upper layers.

Figure 1C:
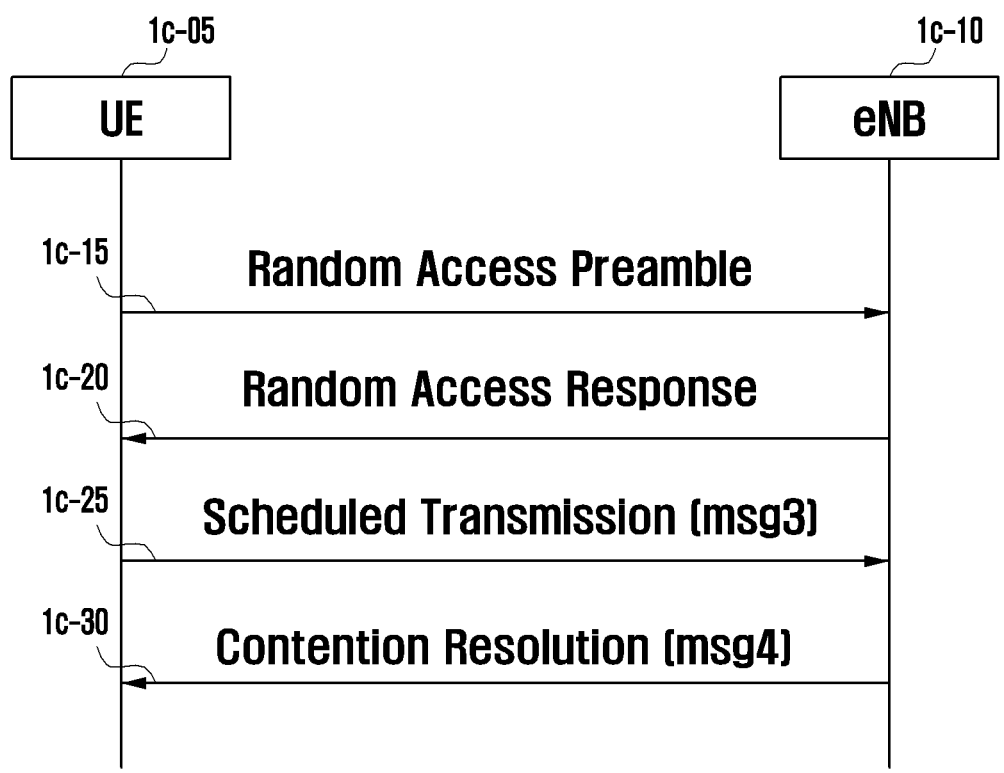
FIG. 1C is a diagram illustrating a random access process in the disclosure.

FIG. 1C is a diagram illustrating a random access process in the disclosure.

Random access is performed when performing uplink synchronization or transmitting data over a network. More specifically, random access may be performed when switching from an idle mode to a connected mode, performing RRC re-establishment, performing handover, and initiating uplink and downlink data. When the terminal 1c-05 receives a dedicated preamble from the base station 1c-10, the terminal 1c-05 may transmit the preamble by applying the same. Otherwise, the terminal may select one of two preamble groups, and may select a preamble belonging to the selected group. The groups will be referred to as "group A" and "group B". If the channel quality state is higher than a specific threshold, and if the size of msg 3 is greater than a specific threshold, a preamble belonging to group B may be selected, otherwise, a preamble belonging to group A may be selected. If the preamble is transmitted in the $n^{th}$ subframe (1c-15), a random access response (RAR) window starts from the $(n+3)^{th}$ subframe, and it may be monitored whether or not the RAR is transmitted within the window time interval (1c-20). Scheduling information of the RAR is indicated by an RA-RNTI of a PDCCH. The RA-RNTI may be derived using the position of a radio resource in time and frequency axes, which is used to transmit the preamble. The RAR includes a timing advance command, a UL grant, and a temporary C-RNTI. If the RAR is successfully received within the RAR window, msg3 may be transmitted using information about the UL grant included in the RAR (1c-25). Msg3 includes different information depending on the purpose of the random access. The table below is an example of information contained in msg 3.

TABLE 1

Examples of information included in msg3

| CASE | Message 3 Contents |
| --- | --- |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

If the RAR is received in the $n^{th}$ subframe, msg3 is transmitted in the $(n+6)^{th}$ subframe. HARQ is applied to Msg3. After transmitting msg3, the terminal may drive a specific timer, and may monitor a contention resolution (CR) message until the timer expires (1c-30). The CR message includes an RRC connection setup, an RRC connection re-establishment message, or the like depending on the purpose of random access in addition to a CR MAC CE.

The disclosure proposes a technology in order for the terminal in an idle mode (RRC_Idle) or an inactive mode (RRC_Inactive) to transmit and receive predetermined small-sized user data during the random access process to the base station without switching to a connected mode (RRC_Connected) in a mobile communication system. In the disclosure, the technology will be referred to as "early data transmission (EDT)". In particular, the disclosure proposes a method in which the base station transmits user data to the terminal (mobile terminated-initiated, MT-initiated) using the EDT technology. In the disclosure, the downlink transmission will be referred to as "downlink early data transmission (DL EDT)". DL EDT may have various options depending on whether the user data is transmitted while being contained in a paging message, an RAR, or msg4, and in the disclosure, and the user data is contained in the RAR and is then transmitted. Although details of the disclosure are described based on an LTE system, the technology of the disclosure may also be applied to an NR system. For example, eNB corresponds to gNB, and MME corresponds to AMF.

Figure 1D:
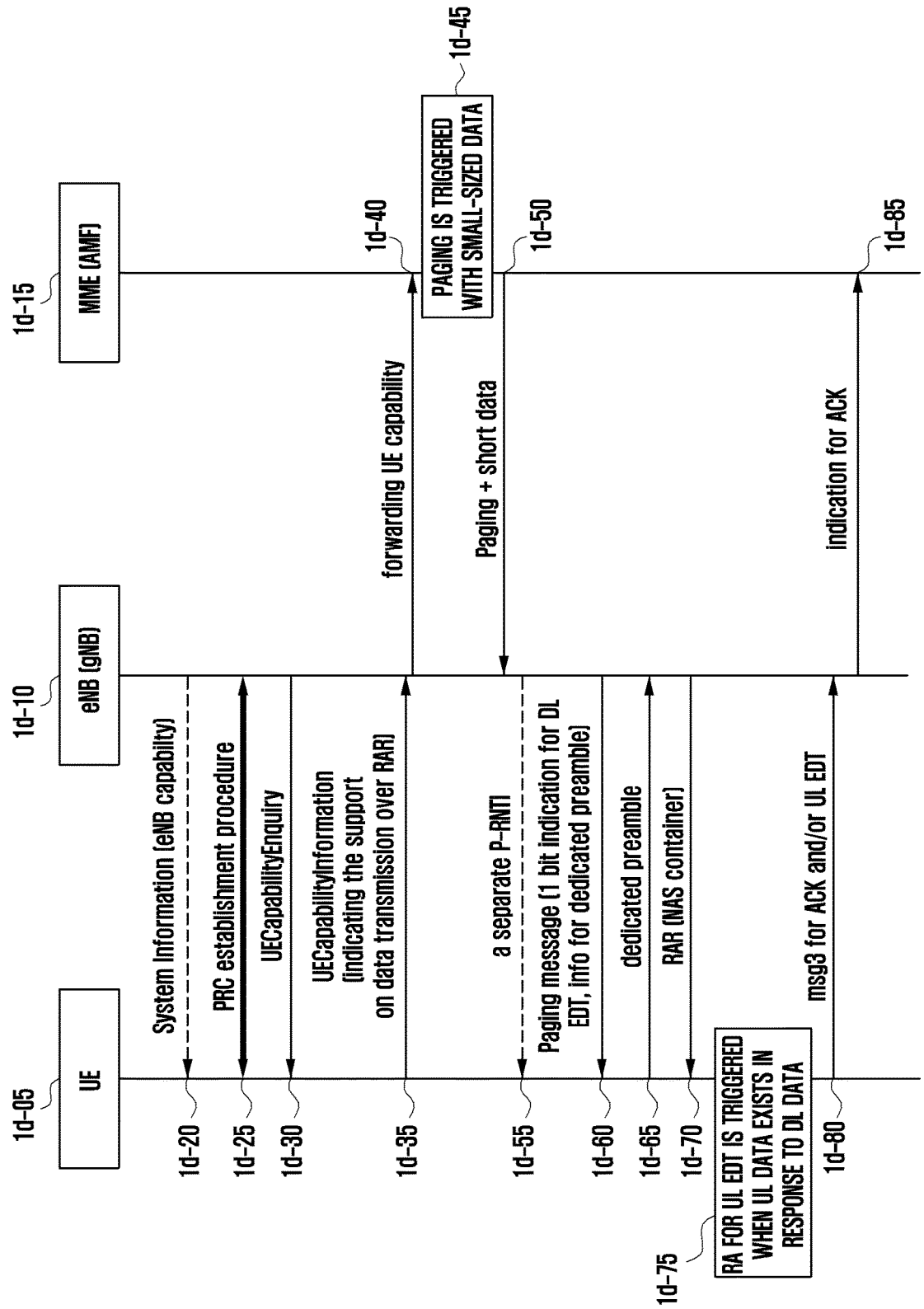
FIG. 1D is a flowchart illustrating a process of including user data in a random access response message and transmitting the same in the disclosure.

FIG. 1D is a flowchart illustrating a process of including user data in a random access response message and transmitting the same in the disclosure.

Wireless devices used in machine-type communication (MTC) or IoT (Internet of Things) need to transmit and receive very small sized user data. For example, several-bit data is required to be transmitted and received in order to turn on or off some of the functions of the wireless devices. Although the random access response message (RAR) is very limited in size, there is no big problem in transmitting several-bit data, and the use of RAR makes it possible to reduce the time required to transmit and receive user data.

The terminal 1d-05 may identify whether or not the base station supports EDT through system information broadcast by the base station 1d-10 (1d-20). The base station may specifically configure whether or not to support DL EDT or to support DL EDT using an RAR in the system information. In addition, the base station may provide dedicated preambles used for the DL EDT operation using an RAR through the system information.

The terminal may switch to a connected mode through a process of connection with the base station (1d-25). The base station may make a request to the terminal for UE capability information using a predetermined RRC message (1d-30). The terminal may report its own capability information to the base station (1d-35). The UE capability information may include an indicator indicating whether or not the terminal supports DL EDT using an RAR. The base station, having obtained the capability information from the terminal, may transmit the information to the MME (1d-40).

Paging may be triggered in the MME in order to transmit, to the terminal, small-sized user data capable of being contained in the RAR (1d-45). The MME may determine whether or not the terminal supports DL EDT using a paging message and whether or not the user data is able to be contained in the RAR. The amount of user data capable of being contained in the RAR may be pre-reported from the base station, or may be defined as a fixed value. If the above two criteria are satisfied, the MME may transmit small-sized user data while transmitting a paging to the base station (1d-50). In addition, the user data may be indicated to be transmitted through the RAR.

The base station, having received the paging and the user data, may transmit, to the terminal, a PDCCH to which a separate RNTI indicating that a paging message is configured as only the paging record of a user related to DL EDT is applied (1d-55). Alternatively, the PDCCH to which an existing P-RNTI is applied may be transmitted to the terminal. The base station may transmit a paging message containing predetermined information to the terminal (1d-60). The paging record of the terminal that is to receive the user data contained in the RAR may contain an indicator indicating the same and dedicated preamble information. One or more paging records may be associated with the RAR-based DL EDT. Since the terminal that is to receive the user data contained in the RAR decodes all the received paging messages, the terminal may recognize whether or not another terminal is to receive the user data through the RAR.

The terminal to receive the user data contained in the RAR may transmit the provided dedicated preamble to the base station (1d-65).

The base station may transmit an RAR containing an MAC RAR corresponding to the dedicated preamble (1d-70). In general, one RAR may provide MAC RARs to a plurality of terminals. The user data for a plurality of terminals may also be contained in one RAR, and user data of each terminal is contained in a NAS container of a corresponding MAC SDU. Therefore, there may be a plurality of NAS containers containing the user data in one RAR. The reason for using the NAS container is to apply NAS security. DCI corresponding to the RA-RNTI transmitted in the PDCCH may include information on the MAC SDU including the NAS container in the RAR. For example, information on the number of MAC SDUs or NAS containers contained in the RAR (this is the same as the number of subheaders related to the RAR-based DL EDT) may be included in the DCI. The above information is used for identifying the location of the MAC SDU in the RAR. Alternatively, one RAR may be limited to having only one MAC SDU.

If there is uplink user data to be transmitted in response to downlink user data contained in the RAR, or if the purpose of ACK/NACK is needed (1d-75), the terminal may transmit the uplink user data or a predetermined message for the purpose of ACK/NACK using an msg3 message (1d-80). The msg3 may be transmitted using UL grant information provided by the RAR.

The base station may forward the received uplink user data or ACK/NACK information to the MME (1d-85).

FIG. 1E is a diagram illustrating the configuration of a random access response message that does not contain user data in the disclosure.

FIG. 1EA is an example of the configuration of an RAR. One RAR includes one MAC header and one or more MAC RARs. A padding may be added as an option. The MAC header has a variable size, and includes one or more MAC PDU subheaders. Each MAC PDU subheader (i.e., an E/T/RAPID MACA subheader) except a BI subheader (i.e., an E/T/R/R/BI subheader) corresponds to one MAC RAR. The BI subheader is included in the RAR as an option, and is located at the head of the MAC header.

FIG. 1EB is a diagram illustrating the configuration of an E/T/RAPID MAC subheader. Field E indicates whether or not another subheader exists after the subheader. If the value is 1, another subheader exists subsequent thereto, but if the value is 0, a MAC RAR or a padding follows the same. Field T may indicate whether the subheader is an E/T/RAPID MAC subheader or an E/T/R/R/BI MAC subheader. If the value is 0, the subheader is an E/T/R/R/BI MAC subheader, and if the value is 1, the subheader is an E/T/RAPID MAC subheader. Field RAPID is an ID of a random access preamble, and is used to indicate the preamble that was transmitted.

FIG. 1EC is a diagram illustrating the configuration of an E/T/R/R/BI MAC subheader. R is a reserved bit. BI indicates a backoff value. This information is used to derive a waiting time until retrying if the random access is not successfully completed.

FIG. 1ED is a diagram illustrating the configuration of a MAC RAR. Timing advance command information indicates information on transmission timing to be adjusted for uplink synchronization. UL grant is scheduling information of msg3. A temporary C-RNTI may be used to indicate DCI corresponding to msg4 in a PDCCH, and may be converted to a C-RNTI after the random access.

Figure 1F:
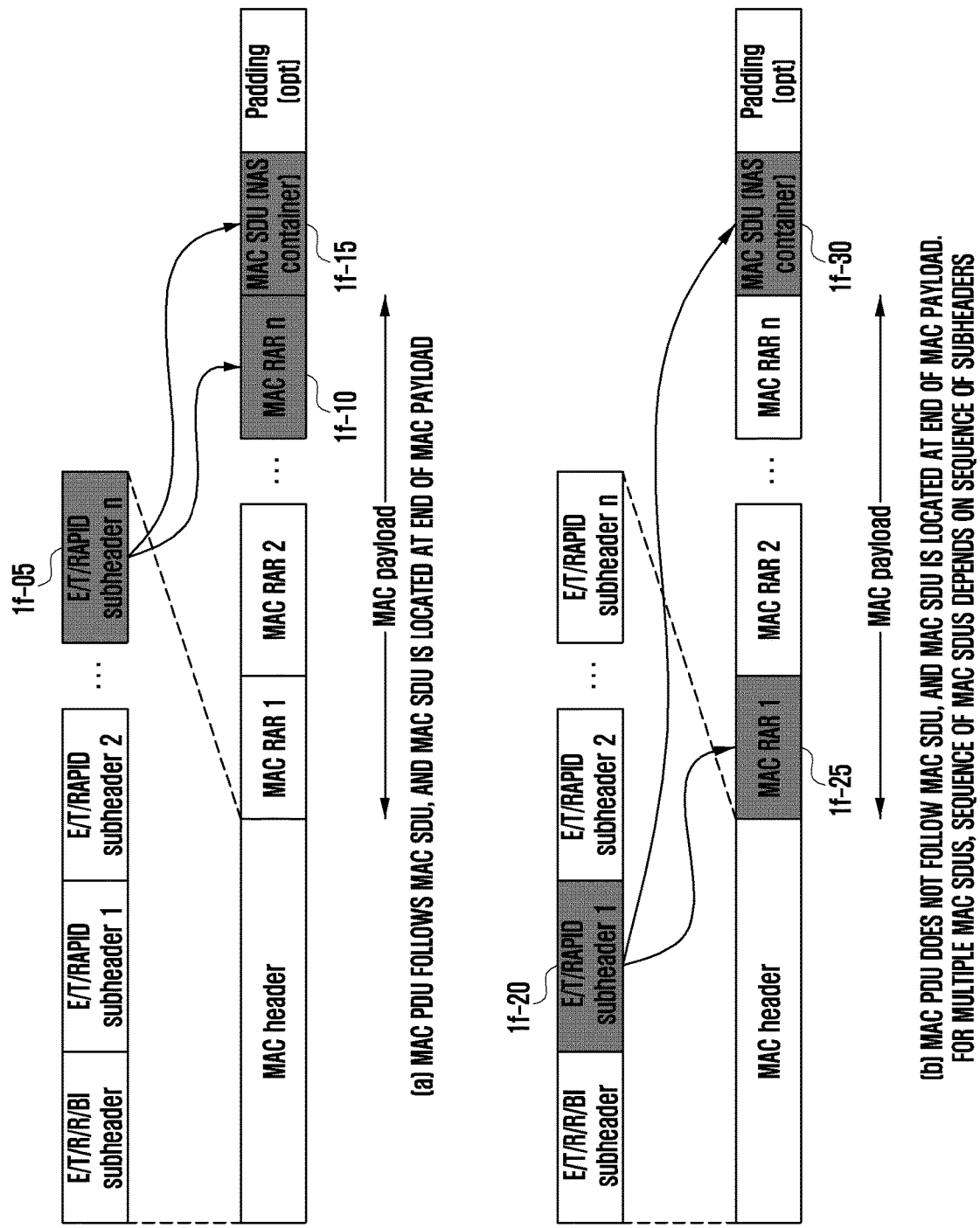
FIGS. 1FA and 1FB are diagrams illustrating the configuration of a random access response message containing user data in the disclosure.

FIGS. 1FA and 1FB are diagrams illustrating the configuration of a random access response message containing user data in the disclosure.

In FIG. 1FAA illustrating a first embodiment of the configuration of a random access response message containing user data, a subheader 1f-05 including RAPID indicating a preamble related to the RAR-based DL EDT corresponds to one MAC RAR 1f-10 and one MAC SDU 1f-15. The subheader is always located after other subheaders that are not related to the RAR-based DL EDT in the MAC header. The MAC RAR and MAC SDU mapped to the subheader are adjacent to each other, and are always located after MAC RARs mapped to other subheaders that are not related to the RAR-based DL EDT. However, the MAC RAR and MAC SDU precede the padding. The reason for placing the MAC SDU at the rear in the MAC payload is to minimize the effect on terminals that do not support DL EDT. One RAR may have multiple combinations of a subheader, including RAPID indicating a preamble related to the RAR-based DL EDT, and one MAC RAR and one MAC SDU, which correspond thereto. The MAC SDU has a NAS container including user data. There may be a predetermined RRC message containing the NAS container. The RRC message belongs to SRB0. The RRC message includes S-TMSI information of a terminal receiving the user data and establishment cause information, as well as the NAS container. The cause information is used to indicate the type of user data. For example, the cause information may indicate MT data or delay tolerant access.

In FIG. 1FAB illustrating a second embodiment of the configuration of a random access response message containing user data, a subheader 1f-20 including RAPID indicating a preamble related to the RAR-based DL EDT corresponds to one MAC RAR 1f-25 and one MAC SDU 1f-30. The subheader is located after a BI subheader in a MAC header, and is not limited to a specific sequence with respect to other E/T/RAPID MAC subheaders. The MAC RAR and MAC SDU, which are mapped to the subheader, do not need to be adjacent to each other. The position of the mapped MAC RAR in the MAC payload is the same as the position of the subheader in the MAC header. However, the mapped MAC SDU always follows other MAC RARs. In the case of a plurality of MAC SDUs, the sequence thereof follows the sequence of the mapped subheaders in the MAC header. However, they precede the padding. The reason for placing the MAC SDU at the rear in the MAC payload is to minimize the effect on terminals that do not support DL EDT. One RAR may have multiple combinations of a subheader, including RAPID indicating a preamble related to the RAR-based DL EDT, and one MAC RAR and one MAC SDU, which correspond thereto. The MAC SDU has been described in detail above.

In FIG. 1FBC illustrating a third embodiment of the configuration of a random access response message containing user data, a subheader 1f-35 including RAPID indicating a preamble related to the RAR-based DL EDT corresponds to one MAC RAR 1f-40 and one MAC SDU 1f-45. The subheader is located after a BI subheader in a MAC header, and is not limited to a specific sequence with respect to other E/T/RAPID MAC subheaders. The MAC RAR and MAC SDU, which are mapped to the subheader, are adjacent to each other. The position of the mapped MAC RAR and MAC SDU in the MAC payload is the same as the position of the subheader in the MAC header. However, the MAC RAR and MAC SDU precede the padding. One RAR may have multiple combinations of a subheader, including RAPID indicating a preamble related to the RAR-based DL EDT, and one MAC RAR and one MAC SDU, which correspond thereto. The MAC SDU has been described in detail above.

In FIG. 1FBD illustrating a fourth embodiment of the configuration of a random access response message containing user data, there are two subheaders 1f-50 and 1f-55 including the same RAPID indicating a preamble related to the RAR-based DL EDT, and the first subheader thereof corresponds to one MAC RAR 1f-60, and the second subheader thereof corresponds to one MAC SDU 1f-65. In the MAC header, the first subheader always precedes the second subheader, and the first subheader and the second subheader do not need to be adjacent to each other. The two subheaders follow a BI subheader in a MAC header, and are not limited to a specific sequence with respect to other E/T/RAPID MAC subheaders. The MAC RAR and MAC SDU, which are mapped to the subheader, do not need to be adjacent to each other. The positions of the mapped MAC RAR and MAC SDU in the MAC payload are the same as the positions of the corresponding subheaders in the MAC header. However, the MAC RAR and MAC SDU precede the padding. The reason for defining two subheaders having the same RAPID is to minimize the effect on terminals that do not support DL EDT. One RAR may have multiple combinations of a subheader, including RAPID indicating a preamble related to the RAR-based DL EDT, and one MAC RAR and one MAC SDU, which correspond thereto. The MAC SDU has been described in detail above.

Figure 1G:
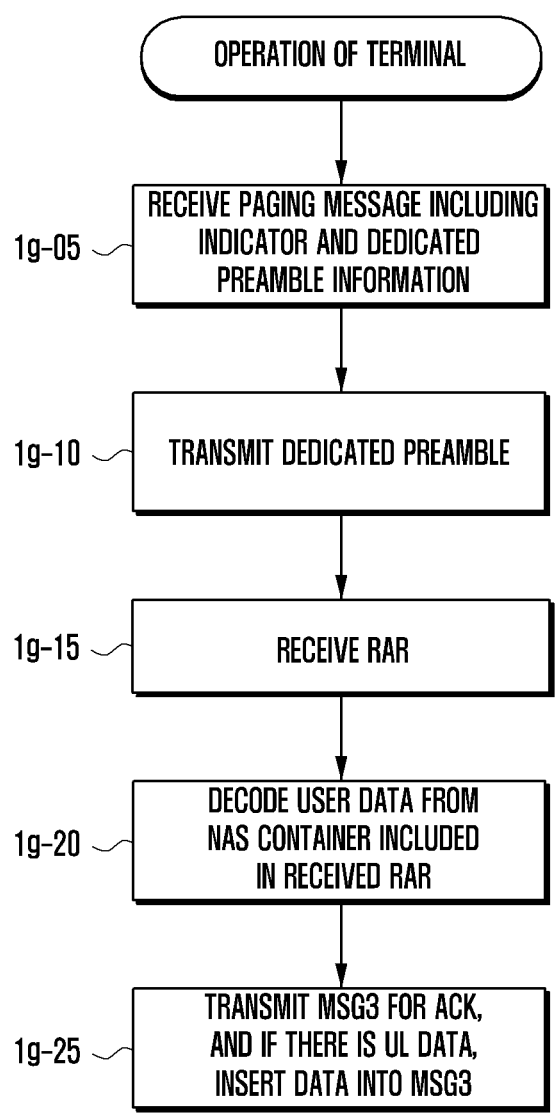
FIG. 1G is a flowchart illustrates the operation of a terminal in the disclosure.

FIG. 1G is a flowchart illustrating the operation of a terminal in the disclosure.

In step 1g-05, the terminal may receive a paging message from the base station. The paging has a paging record corresponding to the terminal. In addition, an indicator indicating performing the RAR-based DL EDT and dedicated preamble information may be provided through the paging.

In step 1g-10, the terminal may transmit the dedicated preamble to the base station.

In step 1g-15, the terminal may receive an RAR from the base station.

In step 1g-20, the terminal may decode user data from a NAS container included in the received RAR.

In step 1g-25, the terminal may transmit msg3 using a UL grant provided from the RAR for the purpose of ACK/NACK. If there is user data required to be transmitted in the uplink, the msg3 may also include the data. The data may be contained in a NAS container, and a predetermined RRC message including the NAS container may be defined.

Figure 1H:
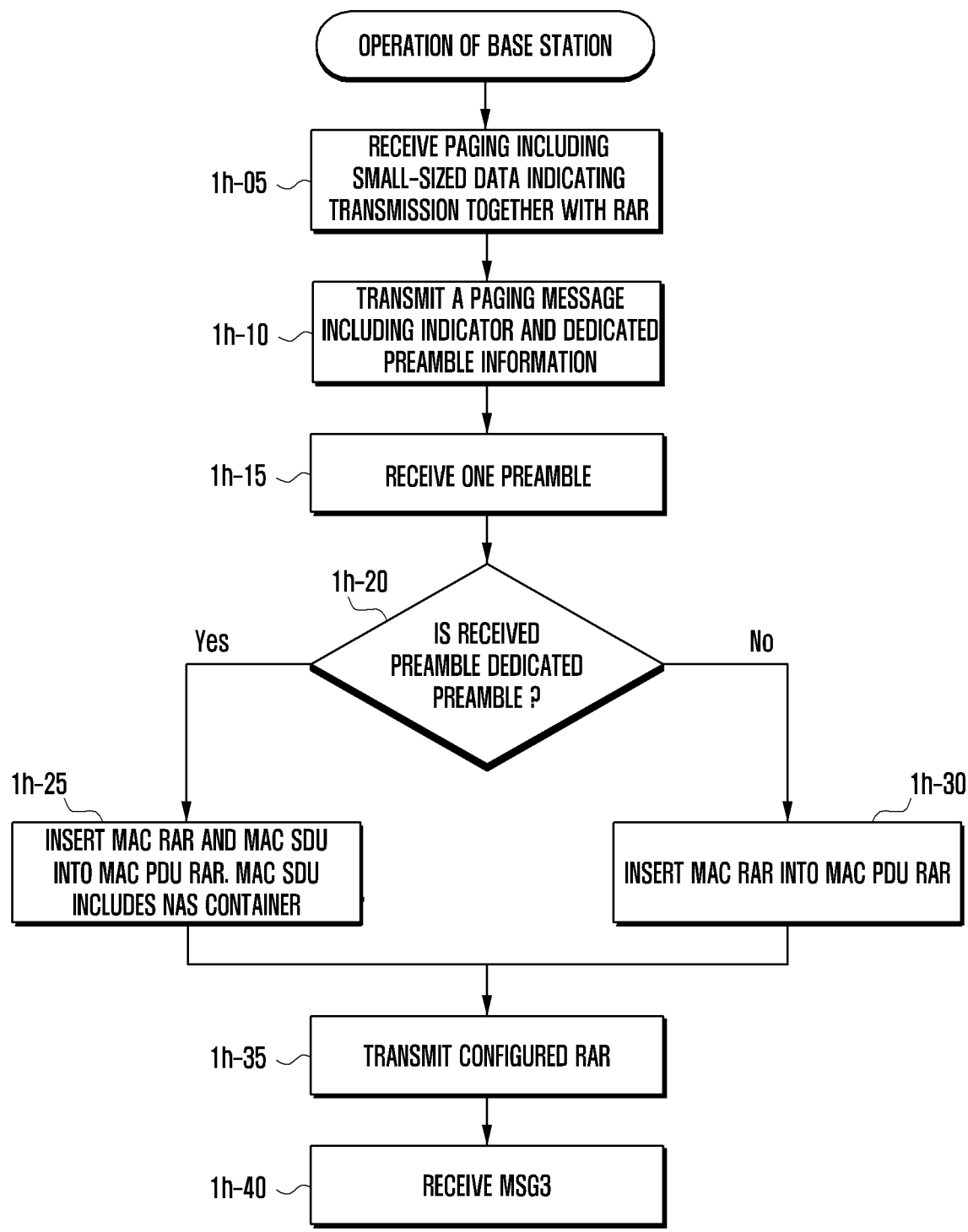
FIG. 1H is a flowchart illustrating the operation of a base station in the disclosure.

FIG. 1H is a flowchart illustrating the operation of a base station in the disclosure.

In step 1h-05, the base station may receive a paging for a specific terminal along with user data from the MME. At this time, the MME may instruct to transmit the user data to the terminal by applying RAR-based DL EDT.

In step 1h-10, the base station may transmit, to the terminal, a paging including an indicator indicating performing of the RAR-based DL EDT and information on a dedicated preamble allocated for the RAR-based DL EDT.

In step 1h-15, the base station may receive one preamble from the terminal.

In step 1h-20, the base station may determine whether or not the preamble is the dedicated preamble that was provided.

In step 1h-25, if the preamble is the dedicated preamble allocated for the DL EDT, the base station may include a corresponding MAC RAR and a MAC SDU including a NAS container, which contains user data, in an RAR.

In step 1h-30, if the preamble is not the dedicated preamble allocated for the DL EDT, the base station may include a corresponding MAC RAR in the RAR.

In step 1h-35, the base station may transmit the configured RAR to the terminal.

In step 1h-40, the base station may receive msg3 from the terminal. The msg3 may include a NAS container containing the user data.

Figure 1I:
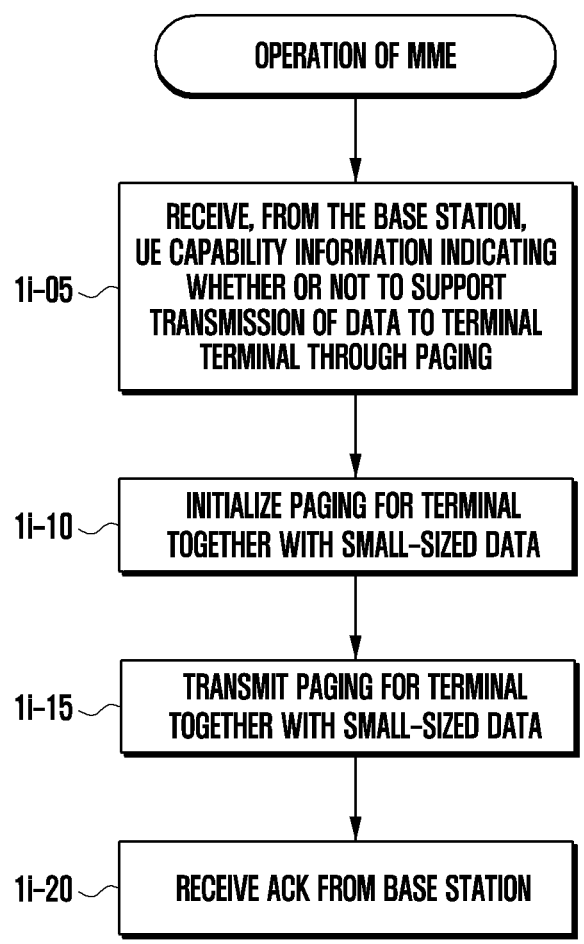
FIG. 1I is a flowchart illustrating the operation of an MME in the disclosure.

FIG. 1I is a flowchart illustrating the operation of an MME in the disclosure.

In step 1i-05, the MME may receive capability information for a specific terminal from the base station. The capability information may include information on whether or not the terminal supports the RAR-based DL EDT.

In step 1i-10, the MME may trigger paging for the terminal, and may have user data to be transmitted through DL EDT.

In step 1i-15, if the base station supports RAR-based DL EDT, the MME may transmit the paging to the base station together with the user data.

In step 1i-20, the MME may receive, from the base station, ACK information indicating that the user data has been successfully transmitted.

Figure 1J:
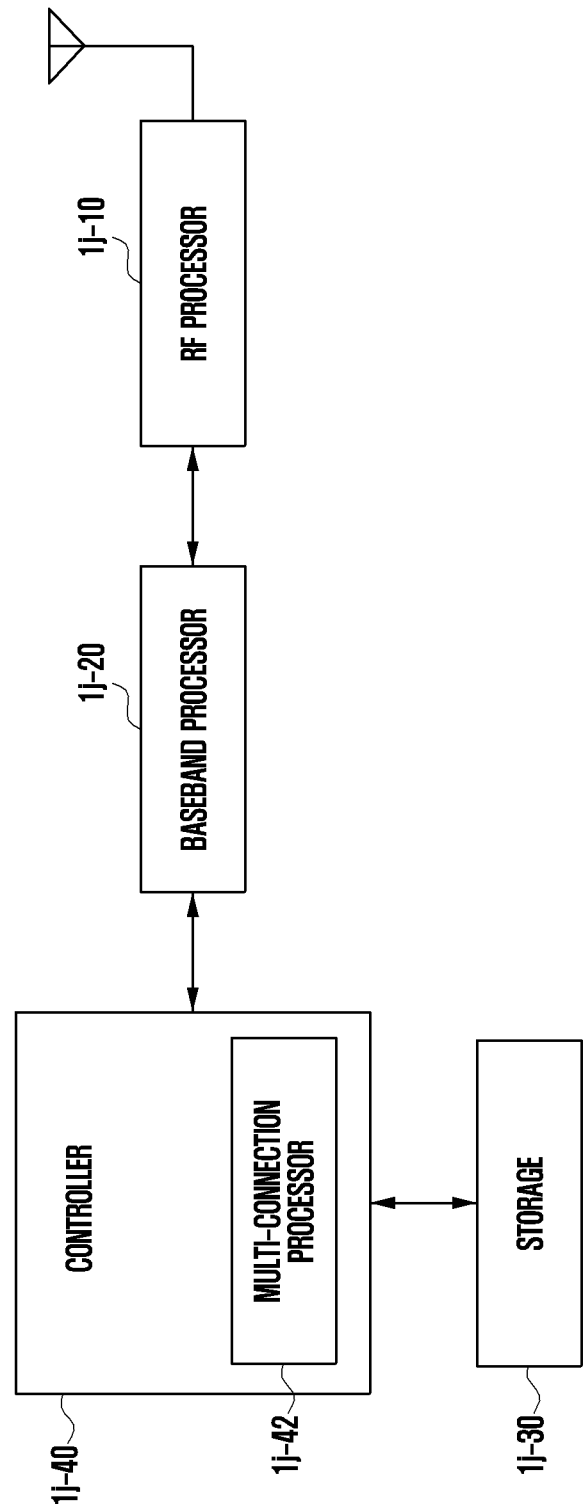
FIG. 1J is a block diagram illustrating an internal structure of a terminal to which the disclosure is applied.

FIG. 1J illustrates the structure of a terminal.

Referring to the drawing, a terminal includes a radio frequency (RF) processor 1j-10, a baseband processor 1j-20, a storage 1j-30, and a controller 1j-40.

The RF processor 1j-10 performs a function of transmitting and receiving a signal through a radio channel, such as band conversion and amplification of a signal. That is, the RF processor 1j-10 up-converts a baseband signal provided from the baseband processor 1j-20 to an RF band signal to thus transmit the same through an antenna, and down-converts an RF band signal received through the antenna to a baseband signal. For example, the RF processor 1j-10 may include a transmission filter, a reception filter, an amplifier, a mixer, an oscillator, a digital-to-analog converter (DAC), an analog-to-digital converter (ADC), and the like. Although only one antenna is illustrated in FIG. 1J, the terminal may have a plurality of antennas. In addition, the RF processor 1j-10 may include a plurality of RF chains. Further, the RF processor 1j-10 may perform beamforming. To perform beamforming, the RF processor 1j-10 may adjust the phases and magnitudes of signals transmitted and received through a plurality of antennas or antenna elements. In addition, the RF processor may perform MIMO, and may receive a plurality of layers when performing MIMO.

The baseband processor 1j-20 performs a function of conversion between a baseband signal and a bit string according to the physical layer specification of the system. For example, when transmitting data, the baseband processor 1j-20 encodes and modulates transmission bit strings, thereby generating complex symbols. In addition, upon receiving data, the baseband processor 1j-20 demodulates and decodes a baseband signal provided from the RF processor 1j-10 to thus recover reception bit strings. For example, in the case where an orthogonal frequency division multiplexing (OFDM) scheme is applied, when transmitting data, the baseband processor 1j-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 1j-20 divides the baseband signal provided from the RF processor 1j-10 into OFDM symbol units, restores the signals mapped to the subcarriers through a fast Fourier transform (FFT) operation, and then restores reception bit strings through demodulation and decoding.

The baseband processor 1j-20 and the RF processor 1j-10 transmit and receive signals as described above. Accordingly, the baseband processor 1j-20 and the RF processor 1j-10 may be referred to as a "transmitter", a "receiver", a "transceiver", or a "communication unit". Further, at least one of the baseband processor 1j-20 and the RF processor 1j-10 may include a plurality of communication modules to support a plurality of different radio access techniques. In addition, at least one of the baseband processor 1j-20 and the RF processor 1j-10 may include different communication modules to process signals of different frequency bands. For example, the different radio access techniques may include a wireless LAN (e.g., IEEE 802.11), a cellular network (e.g., LTE), and the like. The different frequency bands may include super-high frequency (SHF) (e.g., 2.NRHz or NRhz) bands and millimeter wave (e.g., 60 GHz) bands.

The storage 1j-30 stores data such as basic programs, application programs, configuration information, and the like for the operation of the terminal. In particular, the storage 1j-30 may store information related to a second access node for performing wireless communication using a second radio access technique. In addition, the storage 1j-30 provides the stored data in response to a request from the controller 1j-40.

The controller 1j-40 controls the overall operation of the terminal. For example, the controller 1j-40 transmits and receives signals through the baseband processor 1j-20 and the RF processor 1j-10. In addition, the controller 1j-40 records and reads data in and from the storage 1j-40. To this end, the controller 1j-40 may include at least one processor. For example, the controller 1j-40 may include a communication processor (CP) for controlling communication and an application processor (AP) for controlling upper layers such as application programs and the like.

Figure 1K:
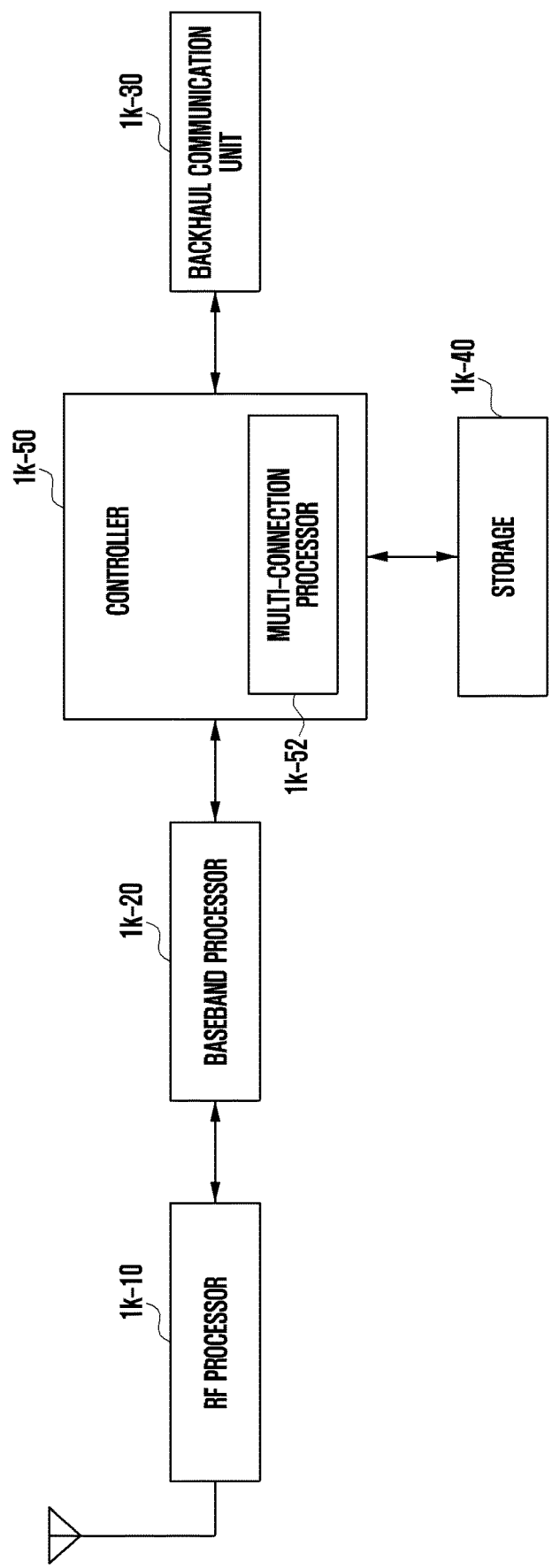
FIG. 1K is a block diagram illustrating the configuration of a base station according to the disclosure.

FIG. 1K is a block diagram illustrating the configuration of a primary base station in a wireless communication system according to an embodiment of the disclosure.

As shown in the drawing, the base station includes an RF processor 1k-10, a baseband processor 1k-20, a backhaul communication unit 1k-30, a storage 1k-40, and a controller 1k-50.

The RF processor 1k-10 performs a function of transmitting and receiving signals through a radio channel, such as band conversion and amplification of a signal and the like. That is, the RF processor 1k-10 up-converts a baseband signal provided from the baseband processor 1k-20 to an RF band signal, to thus transmit the same through an antenna, and down-converts an RF band signal received through the antenna to a baseband signal. For example, the RF processor 1k-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 1k-10 may include a plurality of RF chains. Further, the RF processor 1k-10 may perform beamforming. To perform beamforming, the RF processor 1k-10 may adjust the phases and magnitudes of signals transmitted and received through a plurality of antennas or antenna elements. The RF processor may perform a downlink MIMO operation by transmitting one or more layers.

The baseband processor 1k-20 performs a function of conversion between a baseband signal and a bit string according to a physical layer specification of a first radio access technique. For example, when transmitting data, the baseband processor 1k-20 encodes and modulates transmission bit strings, thereby generating complex symbols. In addition, upon receiving data, the baseband processor 1k-20 demodulates and decodes a baseband signal provided from the RF processor 1k-10 to thus recover reception bit strings. For example, in the case where an OFDM scheme is applied, when transmitting data, the baseband processor 1k-20 generates complex symbols by encoding and modulating transmission bit strings, maps the complex symbols to subcarriers, and then configures OFDM symbols through the IFFT operation and CP insertion. In addition, when receiving data, the baseband processor 1k-20 divides the baseband signal provided from the RF processor 1k-10 into OFDM symbol units, restores the signals mapped to the subcarriers through the FFT operation, and then restores reception bit strings through demodulation and decoding. The baseband processor 1k-20 and the RF processor 1k-10 transmit and receive signals as described above. Accordingly, the baseband processor 1k-20 and the RF processor 1k-10 may be referred to as a "transmitter", a "receiver", a "transceiver", a "communication unit", or a "radio communication unit".

The backhaul communication unit 1k-30 provides an interface for performing communication with other nodes in the network. That is, the backhaul communication unit 1k-30 converts a bit string, transmitted from the primary base station to another node, such as a secondary base station, a core network, or the like, into a physical signal, and converts physical signals received from other nodes into bit strings.

The storage 1k-40 stores data such as basic programs, application programs, configuration information, and the like for the operation of the primary base station. In particular, the storage 1k-40 may store information about bearers allocated to a connected terminal, a measurement result reported from a connected terminal, and the like. In addition, the storage 1k-40 may store information that is a criterion for determining whether multiple connections are provided to the terminal or are released. In addition, the storage 1k-40 provides the stored data in response to a request from the controller 1k-50.

The controller 1k-50 controls the overall operation of the primary base station. For example, the controller 1k-50 transmits and receives signals through the baseband processor 1k-20 and the RF processor 1k-10 or the backhaul communication unit 1k-30. In addition, the controller 1k-50 records and reads data in and from the storage 1k-40. To this end, the controller 1k-50 may include at least one processor.

Figure 1L:
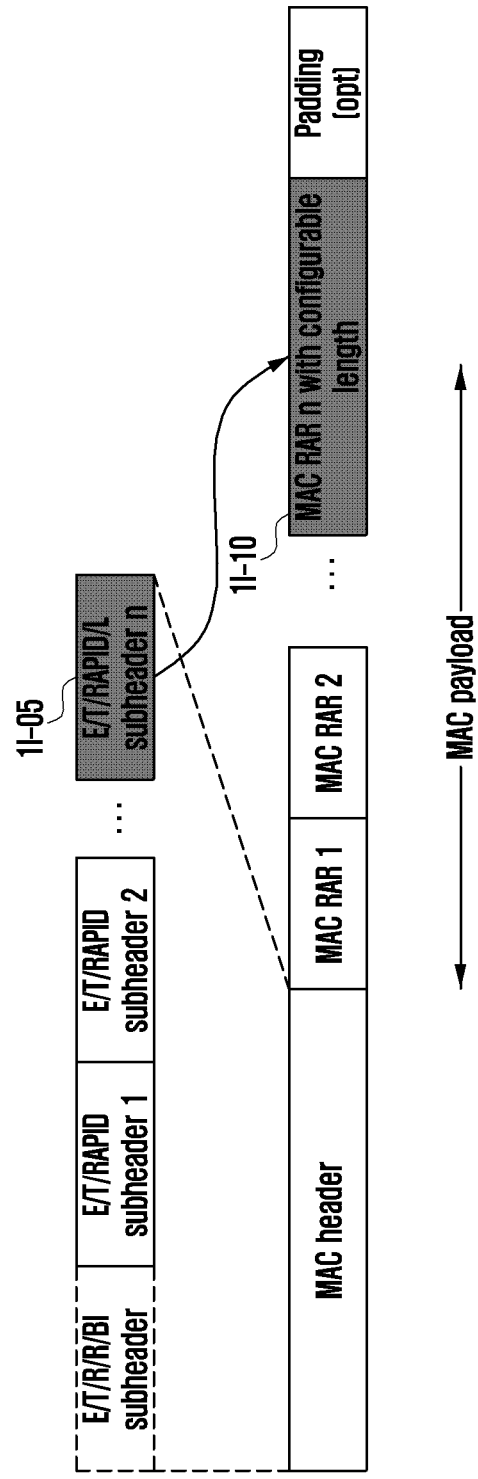
FIG. 1L is a diagram illustrating the configuration of a random access response message containing an RAR subheader having a field L and an RAR having a size L in the disclosure.

FIG. 1L is a diagram illustrating the configuration of a random access response message containing an RAR subheader having field L and an RAR having a size L in the disclosure.

A subheader 1l-05 including RAPID indicating a preamble related to RAR-based DL EDT may correspond to one MAC RAR 1l-10. The subheader is characterized by including a predetermined field indicating the length of a MAC RAR corresponding thereto. The preamble indicated by RAPID contained in the subheader may be used only for the purpose of DL EDT, and the preamble information may be broadcast using system information. The subheader including RAPID for the DL EDT may always include field L indicating the length of the MAC RAR corresponding thereto. That is, the terminal may determine whether or not there is a field L in the subheader depending on whether or not RAPID is used for DL EDT. The corresponding MAC RAR is characterized by having a variable size. The contained sequence of the MAC RAR mapped to the subheader in the MAC payload of the RAR MAC PDU is the same as the contained sequence of the corresponding subheader in the MAC header of the RAR MAC PDU. The MAC RAR mapped to the subheader may precede at least the padding. One RAR may have multiple combinations of a subheader, including RAPID indicating a preamble related to the RAR-based DL EDT, and one MAC RAR and one MAC SDU, which correspond thereto. The MAC RAR having a variable size contains a NAS container including user data. The NAS container may contain user data required to be transmitted to the terminal by a network.

Figure 1M:
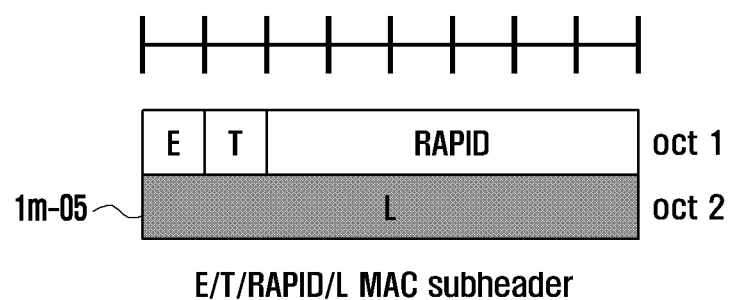
FIG. 1M is a diagram illustrating the configuration of an RAR subheader including a field L in the disclosure.

FIG. 1M is a diagram illustrating the configuration of an RAR subheader including field L in the disclosure.

This is a configuration diagram of E/T/RAPID/L MAC subheader. Field E may indicate whether or not another subheader exists after the subheader. If the value of field E is 1, another subheader may exist subsequent thereto, but if the value of field E is 0, a MAC RAR or a padding may follow the same. Field T may indicate whether the subheader is an E/T/RAPID MAC subheader (or E/T/RAPID/L MAC subheader) or an E/T/R/R/BI MAC subheader. If the value of field T is 0, the subheader is the E/T/R/R/BI MAC subheader, and if the value of field T is 1, the subheader is the E/T/RAPID MAC subheader (or E/T/RAPID/L MAC subheader). Field RAPID is an ID of a random access preamble, and is used to indicate the preamble that was transmitted. RAPID may always indicate a preamble used for EDT in the E/T/RAPID/L MAC subheader. Field L 1m-05 may indicate the length of a MAC RAR corresponding to the subheader. That is, the corresponding MAC RAR has a variable size. Although the size of field L is expressed as 1 byte in FIG. 1M, the size may be greater or less than the same.

Figure 1N:
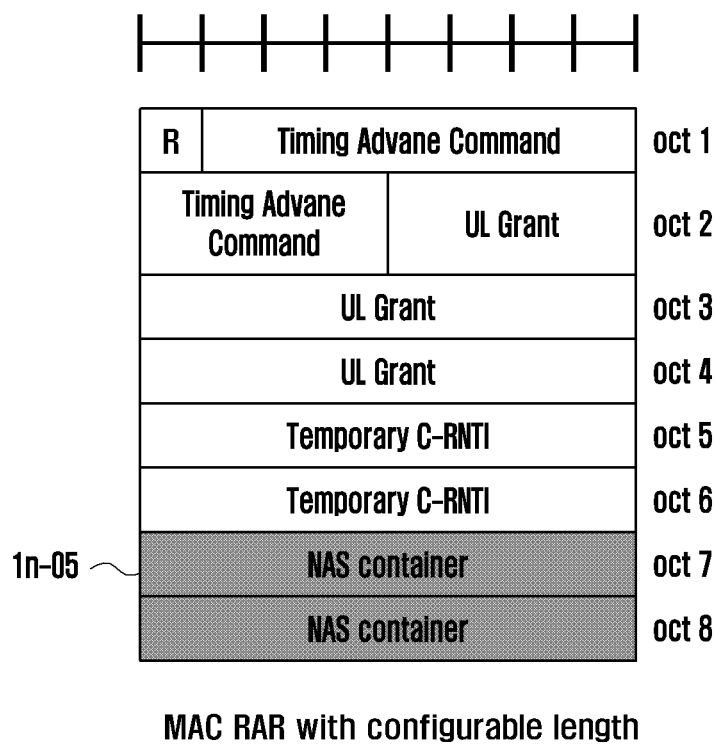
FIG. 1N is a diagram illustrating the configuration of a MAC RAR including a NAS container in the disclosure.
Figure 10:
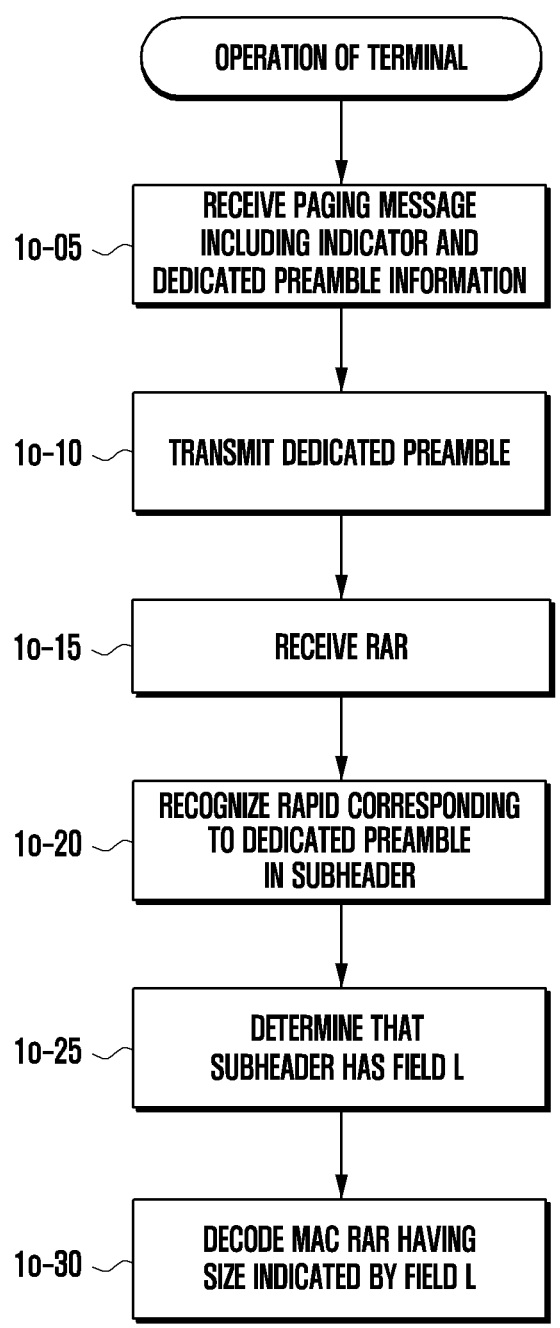

FIG. 1N is a diagram illustrating the configuration of a MAC RAR including a NAS container in the disclosure.

The timing advance command information indicates information on transmission timing to be adjusted for uplink synchronization. The UL grant is scheduling information of msg3. The temporary C-RNTI may be used to indicate DCI corresponding to msg4 in a PDCCH, and may be converted to a C-RNTI after the random access. The NAS container is contained in the rearmost of the MAC RAR 1n-05. The NAS container may have a variable size.

In another embodiment, the MAC RAR having a NAS container of a fixed size may be considered. At this time, field L is not required for the subheader corresponding thereto. However, the size of a MAC RAR indicated by a subheader including RAPID indicating a preamble used for EDT may be different from the size of a MAC RAR indicated by a subheader that does not indicate a preamble used for EDT. That is, since the MAC RAR corresponding to the subheader including RAPID indicating a preamble used for EDT further contains the NAS container, the size thereof is greater than that of an existing MAC RAR. Although the size of the NAS container is fixed, the size is characterized by being defined in units of bytes.

FIG. 1O is a flowchart illustrating the operation of a terminal in the disclosure.

In step 1o-05, the terminal may receive a paging message from the base station. The paging may have a paging record corresponding to the terminal. In addition, an indicator indicating performing RAR-based DL EDT and dedicated preamble information may be provided through the paging.

In step 1o-10, the terminal may transmit the dedicated preamble to the base station.

In step 1o-15, the terminal may receive an RAR from the base station.

In step 1o-20, the terminal may recognize RAPID corresponding to a preamble used for DL EDT from among the subheaders of the RAR.

In step 1o-25, the terminal may determine that the subheader has field L.

In step 1o-30, the terminal may decode an MAC RAR corresponding to the subheader in consideration of the size indicated by the field L.

Figure 1P:
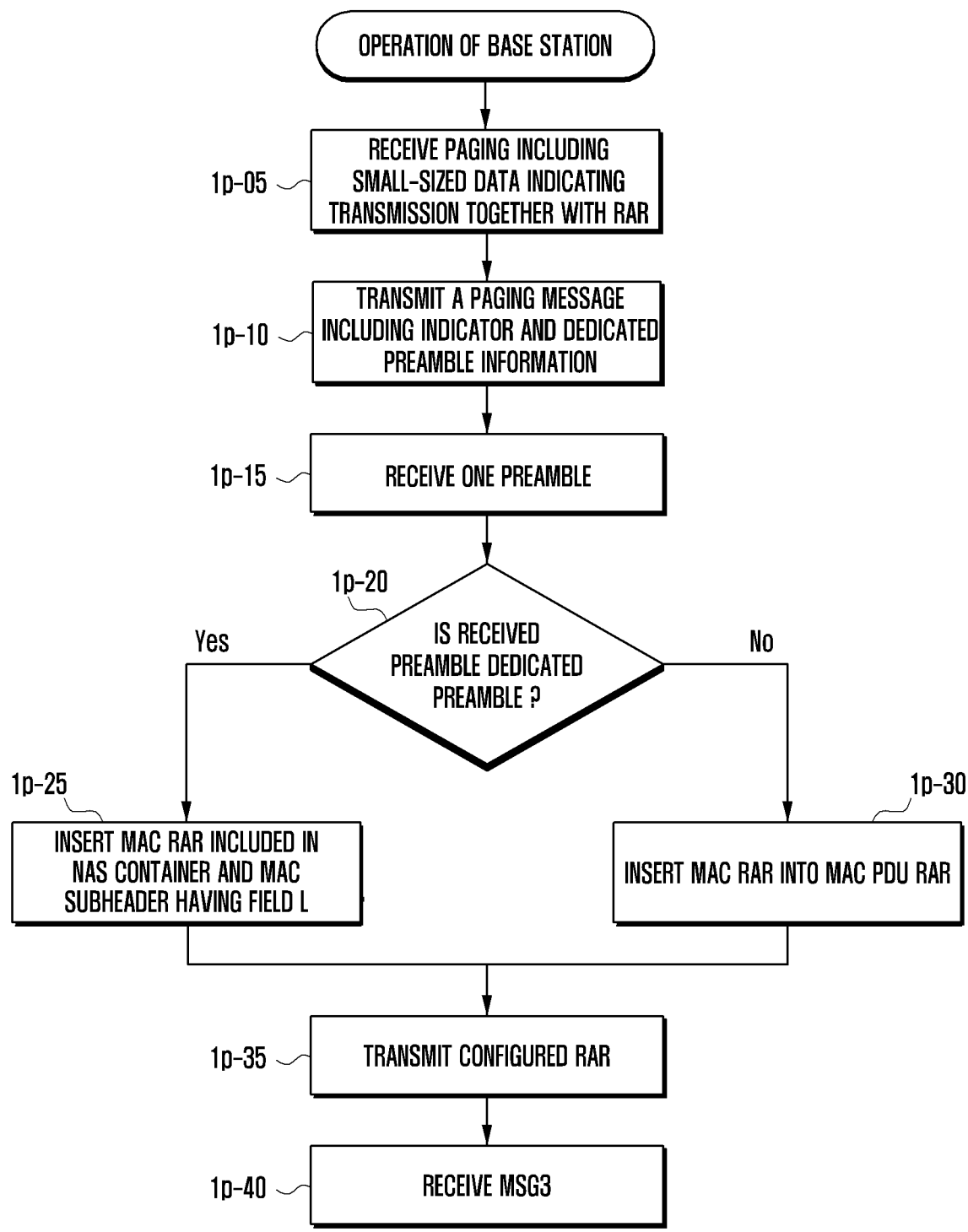
FIG. 1P is a flowchart illustrating the operation of a base station in the disclosure.

FIG. 1P is a flowchart illustrating the operation of a base station in the disclosure.

The base station may transmit, to the terminal, a list of dedicated preambles used for DL EDT using system information.

In step 1p-05, the base station may receive a paging for a specific terminal together with user data from the MME. At this time, the MME may instruct to transmit the user data to the terminal by applying RAR-based DL EDT.

In step 1p-10, the base station may transmit, to the terminal, a paging including an indicator indicating performing RAR-based DL EDT and information on a dedicated preamble allocated for RAR-based DL EDT.

In step 1p-15, the base station may receive one preamble from the terminal.

In step 1p-20, the base station may determine whether or not the preamble is the dedicated preamble that was provided.

In step 1p-25, if the preamble is the dedicated preamble allocated for DL EDT, the base station may include a subheader, having RAPID corresponding to the preamble and field L, and a MAC RAR, including a NAS container corresponding to the subheader, in an RAR.

In step 1p-30, if the preamble is not the dedicated preamble allocated for DL EDT, the base station may include a corresponding MAC RAR in the RAR.

In step 1p-35, the base station may transmit the configured RAR to the terminal.

In step 1p-40, the base station may receive msg3 from the terminal. The msg3 may include a NAS container containing the user data.

Second Embodiment

Hereinafter, the operational principle of the disclosure will be described in detail with reference to the accompanying drawings. In describing the disclosure below, a detailed description of known functions and configurations incorporated herein will be omitted if the description unnecessarily obscures the subject matter of the disclosure. In addition, the terms used herein are defined in consideration of the functions of the disclosure, and may be changed according to the intention or practices of the user or the operator, or the like. Therefore, the definition thereof should be based on the description throughout this specification.

In describing the disclosure below, a detailed description of known functions and configurations incorporated herein will be omitted if the description unnecessarily obscures the subject matter of the disclosure. Hereinafter, embodiments of the disclosure will be described with reference to the accompanying drawings.

Hereinafter, terms for identifying connection nodes, terms referring to network entities, terms referring to messages, terms referring to interfaces between network entities, terms referring to a variety of identification information, and the like will be used only as examples for the convenience of explanation. Therefore, the disclosure is not limited to the terms used herein, and other terms referring to objects having equivalent technical meanings may be used.

For the convenience of explanation, in the disclosure, terms and names defined in the 3rd generation partnership project long-term evolution (3GPP LTE) standard will be used. However, the disclosure is not limited to the above-mentioned terms and names, and the disclosure may be equally applied to systems conforming to other standards. In the disclosure, eNB may be used interchangeably with gNB for convenience of description. That is, the base station described as eNB may represent gNB.

Figure 2A:
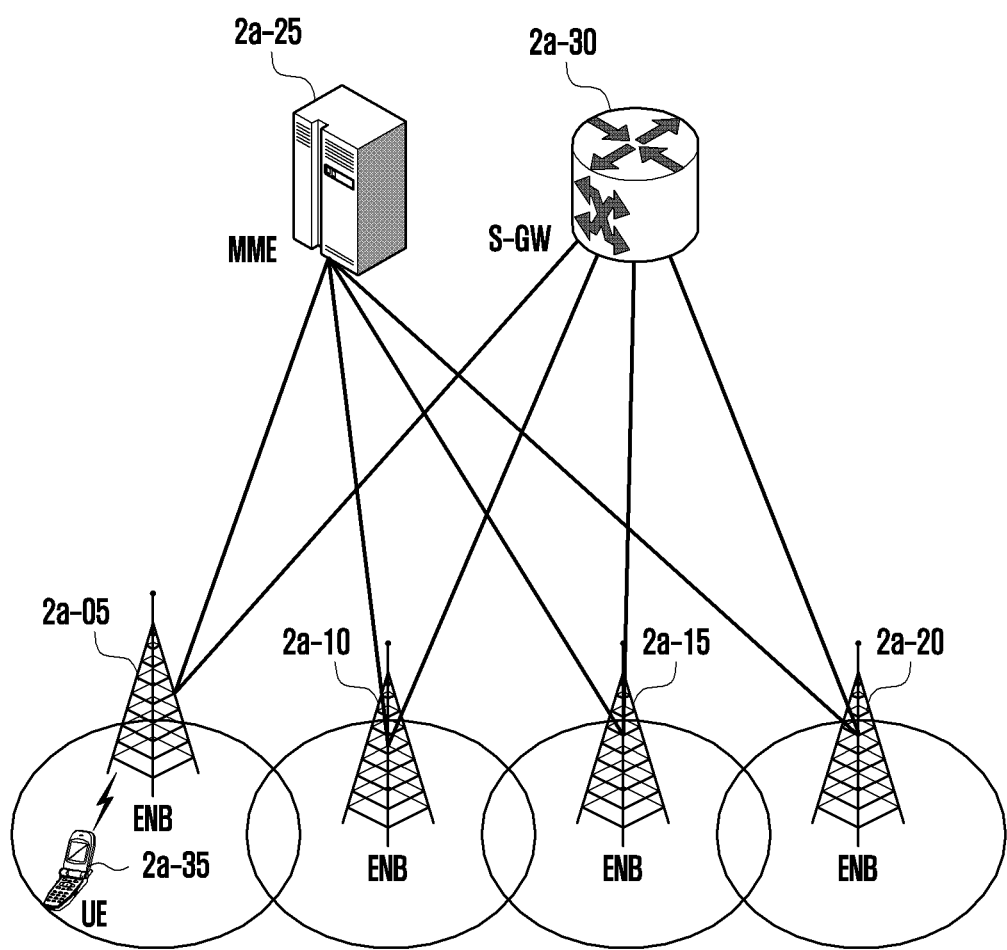
FIG. 2A is a diagram illustrating the structure of an LTE system according to an embodiment of the disclosure.

FIG. 2A is a diagram illustrating the structure of an LTE system according to an embodiment of the disclosure.

Referring to FIG. 2A, a radio access network of an LTE system includes Evolved Node Bs (hereinafter referred to as "ENBs", "Node Bs", or "base stations") 2a-05, 2a-10, 2a-15, and 2a-20, a mobility management entity (MME) 2a-25, and a serving-gateway (S-GW) 2a-30. User equipment (hereinafter referred to as "UE" or "terminal") 2a-35 accesses an external network through the ENBs 2a-05 to 2a-20 and the S-GW 2a-30, as shown in the drawing.

In FIG. 2A, the ENBs 2a-05 to 2a-20 correspond to existing node Bs in a UMTS system. The ENB is connected to the UE 2a-35 through a wireless channel and performs a more complex role than the existing node B. In the LTE system, since all user traffic including real-time services, such as VoIP (Voice over IP) through Internet protocol, is served through a shared channel, a device for collecting status information, such as buffer status, available transmission power status, channel status, and the like of UEs, and performing scheduling is required, and the ENBs 2a-05 to 2a-20 serve as such a device. One ENB typically controls multiple cells. For example, in order to realize a data rate of 100 Mbps, the LTE system uses, as radio access technology, orthogonal frequency division multiplexing (hereinafter referred to as "OFDM") in a bandwidth of, for example, 20 MHz. In addition, an adaptive modulation and coding (hereinafter referred to as "AMC") scheme is applied to determine a modulation scheme and a channel coding rate in accordance with the channel status of a terminal. The S-GW 2a-30 is a device for providing data bearers and generates or removes data bearers under the control of the MME 2a-25. The MME is a device that performs various control functions, as well as a mobility management function for a terminal, and is connected to a plurality of base stations.

Figure 2B:
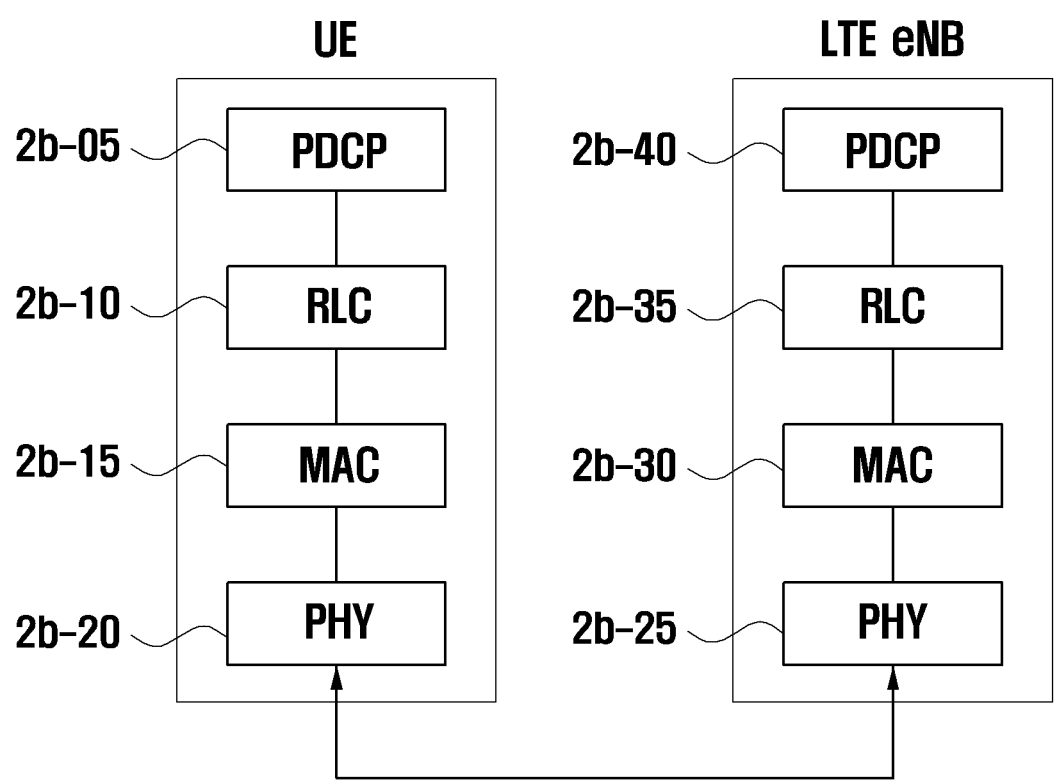
FIG. 2B is a diagram illustrating a radio protocol structure in an LTE system according to an embodiment of the disclosure.

FIG. 2B is a diagram illustrating a radio protocol structure in an LTE system according to an embodiment of the disclosure.

Referring to FIG. 2B, the radio protocol of the LTE system includes a packet data convergence protocol (PDCP) 2b-05 or 2b-40, a radio link control (RLC) 2b-10 or 2b-35, and a medium access control (MAC) 2b-15 or 2b-30 in a terminal and an ENB, respectively. The packet data convergence protocol (PDCP) 2b-05 or 2b-40 performs operations, such as IP header compression/decompression and the like. The primary functions of the PDCP are summarized as follows.

Header compression and decompression (ROHC only)
Transfer of user data
In-sequence delivery of upper layer PDUs at PDCP re-establishment procedure for RLC AM
Sequence reordering (for split bearers in DC (only support for RLC AM): PDCP PDU routing for transmission and PDCP PDU reordering for reception)
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link control (hereinafter referred to as "RLC") 2b-10 or 2b-35 reconfigures a PDCP packet data unit (PDU) to an appropriate size and performs ARQ operation and the like. The primary functions of the RLC are summarized as follows.

Data transfer function (transfer of upper layer PDUs)
ARQ function (error correction through ARQ (only for AM data transfer))
Concatenation, segmentation, and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2b-15 or 2b-30 is connected to a plurality of RLC entities present in a single terminal, multiplexes RLC PDUs into MAC PDUs, and demultiplexes RLC PDUs from MAC PDUs. The primary functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
Padding The physical layer 2b-20 or 2b-25 channel-codes and modulates upper layer data, and converts the same into OFDM symbols to then be transmitted through a wireless channel, or demodulates OFDM symbols received through a wireless channel and channel-decodes the same to then be transmitted to upper layers.

Figure 2C:
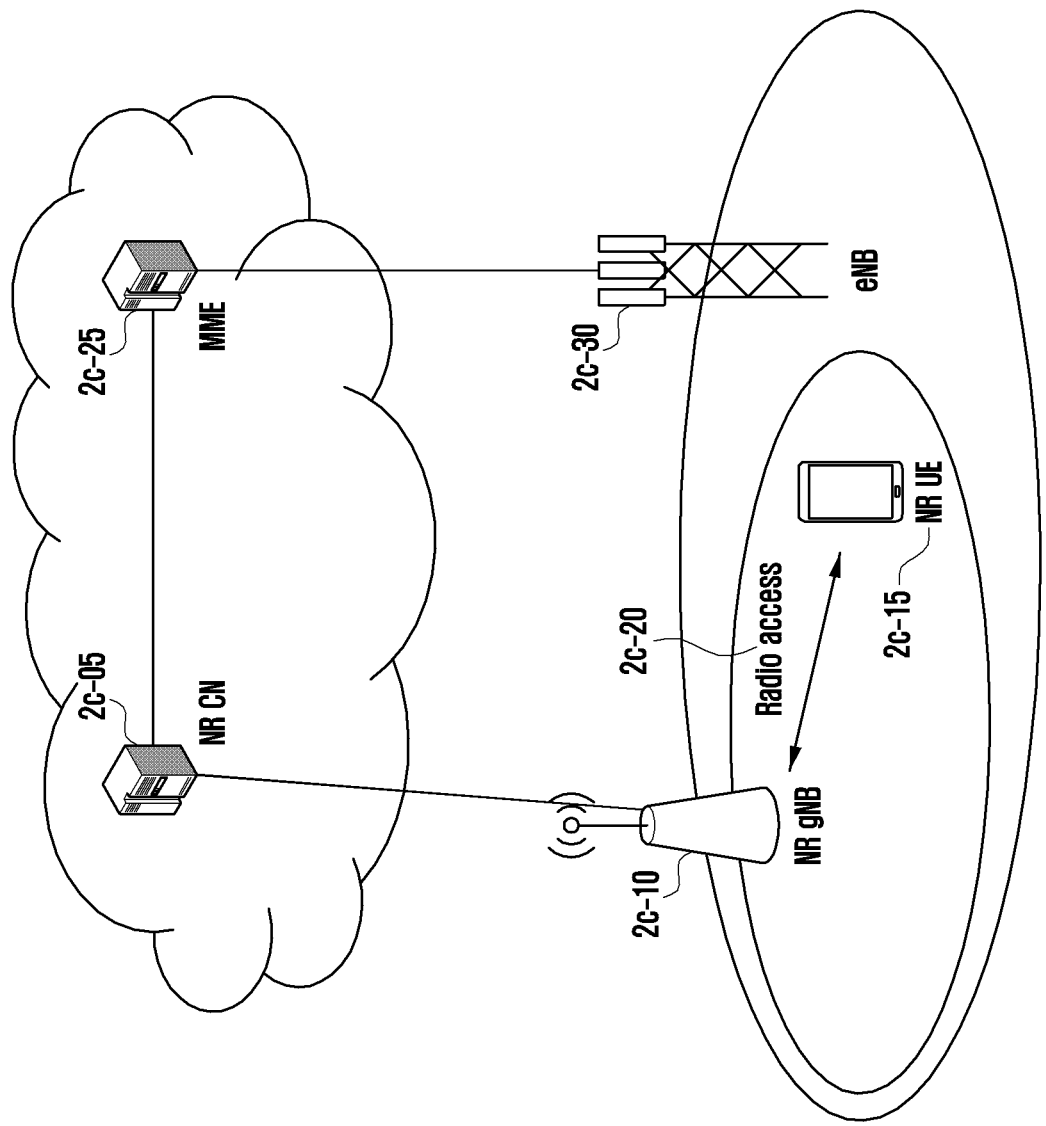
FIG. 2C is a diagram illustrating the structure of a next-generation mobile communication system according to an embodiment of the disclosure.

FIG. 2C is a diagram illustrating the structure of a next-generation mobile communication system according to an embodiment of the disclosure.

Referring to FIG. 2c, a radio access network of a next-generation mobile communication system (hereinafter referred to as "NR" or "2g") includes a new radio node B (hereinafter referred to as "NR gNB" or an "NR base station") 2c-10 and a new radio core network (NR CN) 2c-05 as shown in the drawing. New radio user equipment (hereinafter referred to as "NR UE" or a "terminal") 2c-15 accesses an external network through the NR gNB 2c-10 and the NR CN 2c-05.

In FIG. 2C, the NR gNB 2c-10 corresponds to an evolved node B (eNB) of an existing LTE system. The NR gNB is connected to the NR UE 2c-15 through a wireless channel, and may provide services superior to those of an existing node B. In the next-generation mobile communication system, since all user traffic is served through a shared channel, a device for collecting status information, such as buffer status, available transmission power status, and channel status of UEs and the like, and performing scheduling is required. The NR NB 2c-10 serves as such a device. One NR gNB typically controls multiple cells. In order to realize super-high data rates compared to the existing LTE system, NR gNB may have a bandwidth equal to or greater than the existing maximum bandwidth, may employ, as radio access technology, orthogonal frequency division multiplexing (hereinafter referred to as "OFDM"), and may further employ a beamforming technique in addition thereto. In addition, an adaptive modulation and coding (hereinafter referred to as "AMC") scheme is applied to determine a modulation scheme and a channel coding rate in accordance with the channel status of a terminal. The NR CN 2c-05 performs functions such as mobility support, bearer configuration, and QoS configuration. The NR CN is a device that performs various control functions, as well as a mobility management function for a terminal, and is connected to a plurality of base stations. In addition, the next-generation mobile communication system may interwork with the existing LTE system, and the NR CN is connected to an MME 2c-25 through a network interface. The MME is connected to the eNB 2c-30, which is an existing base station.

Figure 2D:
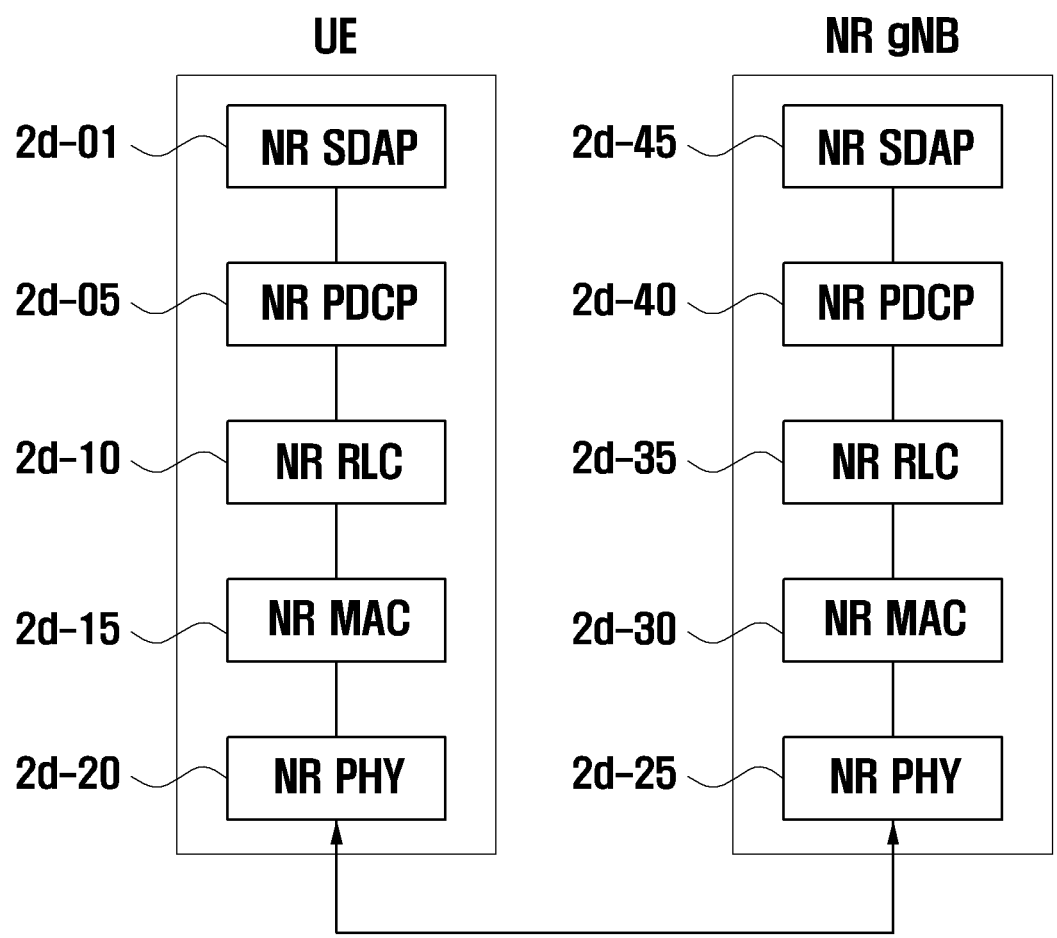
FIG. 2D is a diagram illustrating a radio protocol structure of a next-generation mobile communication system according to an embodiment of the disclosure.

FIG. 2D is a diagram illustrating a radio protocol structure of a next-generation mobile communication system according to an embodiment of the disclosure.

FIG. 2D is a diagram illustrating a radio protocol structure of a next-generation mobile communication system to which the disclosure may be applied.

Referring to FIG. 2D, the radio protocol of the next-generation mobile communication system includes NR SDAP 2d-01 or 2d-45, NR PDCP 2d-05 or 2d-40, NR RLC 2d-10 or 2d-35, and NR MAC 2d-15 or 2d-30 in a terminal and an NR base station, respectively.

The primary functions of the NR SDAP 2d-01 or 2d-45 may include some of the following functions.

Transfer of user plane data
Mapping between a QoS flow and a DRB for both DL and UL
Marking QoS flow ID in both DL and UL packets
Mapping reflective QoS flow to DRB for UL SDAP PDUs With regard to the SDAP layer entity, the terminal may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, the terminal may be instructed to update or reconfigure mapping information between the QoS flow and the data bearers in the uplink and the downlink using a 1-bit NAS reflective QoS configuration indicator and a 1-bit AS reflective QoS configuration indicator of the SDAP header. The SDAP header may include QoS flow ID information indicating the QoS. The QoS information may be used as data processing priority, scheduling information, or the like in order to support effective services.

The primary functions of the NR PDCP 2d-05 or 2d-40 may include some of the following functions.

Header compression and decompression (ROHC only)
Transfer of user data
In-sequence delivery of upper layer PDUs
Out-of-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink The above reordering function of the NR PDCP entity indicates a function of reordering PDCP PDUs received in a lower layer, based on a PDCP sequence number (SN), may include a function of transmitting data to an upper layer in the reordered order, may include a function of directly transmitting data without consideration of sequence, may include a function of reordering the sequence and recording lost PDCP PDUs, may include a function of sending a status report of lost PDCP PDUs to the transmitting end, and may include a function of making a request for retransmission of lost PDCP PDUs.

The primary functions of the NR RLC 2d-10 or 2d-35 may include some of the following functions.

Data transfer function (transfer of upper layer PDUs)
In-sequence delivery of upper layer PDUs
Out-of-sequence delivery of upper layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The above in-sequence delivery function of the NR RLC entity indicates a function of transferring RLC SDUs received from a lower layer to an upper layer in sequence, may include a function of, if a plurality of RLC SDUs divided from one original RLC SDU is received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of lost RLC PDUs to the transmitting end, may include a function of making a request for retransmission of lost RLC PDUs, may include a function of, if there is a lost RLC SDU, transmitting only the RLC SDUs preceding the lost RLC SDU to an upper layer in sequence, may include a function of, if a predetermined timer expires even though there is a lost RLC SDU, transmitting all RLC SDUs received before the timer starts to an upper layer in sequence, or may include a function of, if a predetermined timer expires even though there is a lost RLC SDU, transmitting all RLC SDUs received until the present to an upper layer in sequence. In addition, the RLC PDUs may be processed in the order of reception (in the order of arrival, regardless of a serial number or a sequence number thereof), and may be transmitted to the PDCP entity in a manner of out-of-sequence delivery. In the case of segments, the segments, which are stored in the buffer or will be received later, may be received to then be reconfigured into one complete RLC PDU, and the RLC PDU may be processed, and may be transmitted to the PDCP entity. The NR RLC layer may not include a concatenation function, which may be performed in the NR MAC layer, or may be replaced with a multiplexing function of the NR MAC layer.

The out-of-sequence delivery of the NR RLC entity indicates a function of directly delivering RLC SDUs received from a lower layer to an upper layer, regardless of sequence thereof, may include a function of, if a plurality of RLC SDUs divided from one original RLC SDU is received, reassembling and delivering the same, and may include a function of storing and ordering RLC SNs or PDCP SNs of the received RLC PDUs, thereby recording the lost RLC PDUs.

The NR MAC 2d-15 or 2d-30 may be connected to a plurality of NR RLC layer entities present in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)\
Priority handling between logical channels of one UE
Priority handling between UEs by means of dynamic scheduling
MBMS service identification
Transport format selection
Padding The NR PHY layer 2d-20 or 2d-25 may perform operations of channel-coding and modulating the upper layer data into OFDM symbols and transmitting the same through a wireless channel, or operations of demodulating and channel-decoding the OFDM symbols received through the wireless channel and transmitting the same through the upper layer.

Figure 2E:
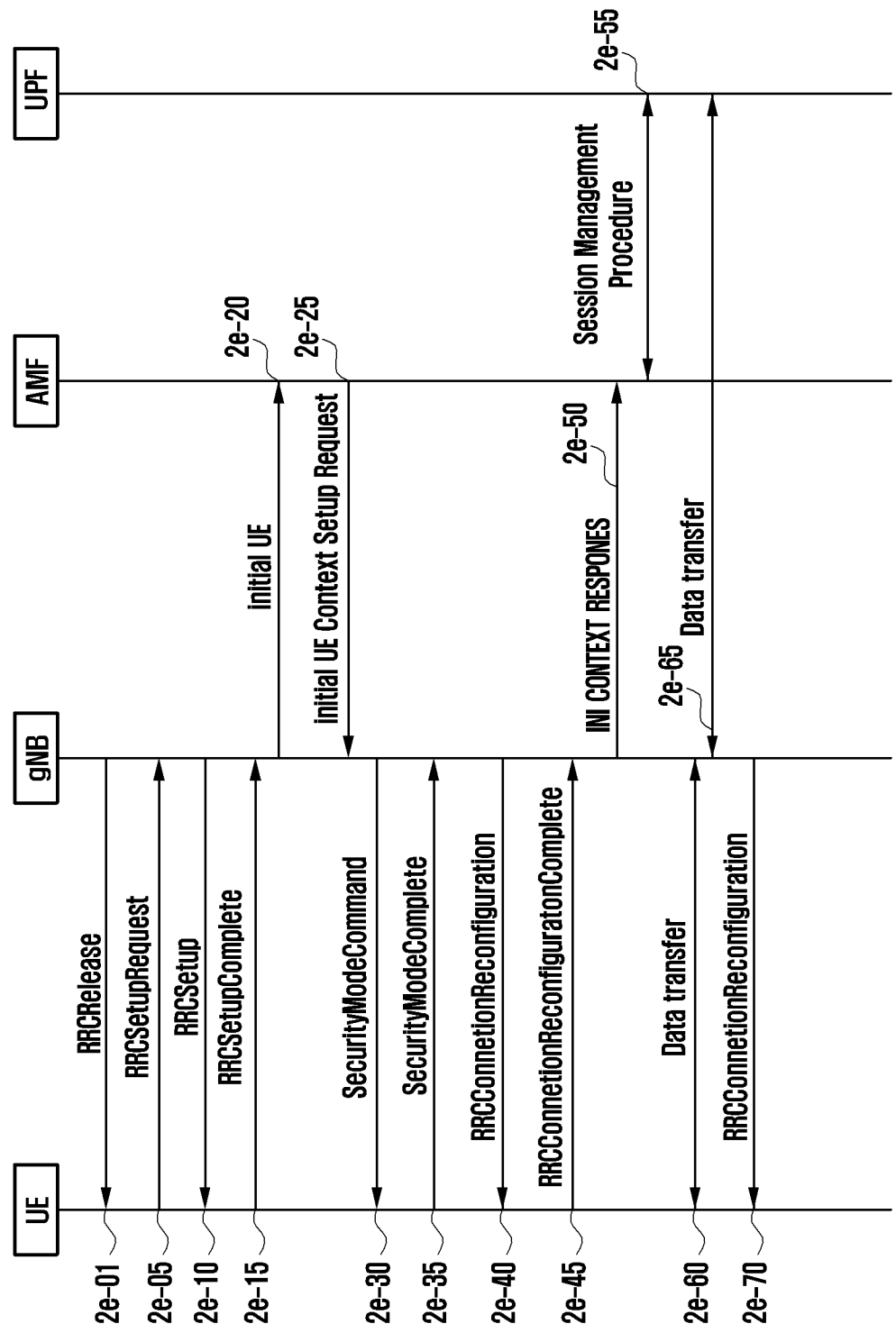
FIG. 2E is a diagram illustrating a procedure in which a base station releases a connection of a terminal so that the terminal switches from an RRC connected mode to an RRC idle mode and a procedure in which a terminal establishes a connection with a base station to then switch from an RRC idle mode to an RRC connected mode according to an embodiment of the disclosure.

FIG. 2E is a diagram illustrating a procedure in which a base station releases a connection of a terminal so that the terminal switches from an RRC connected mode to an RRC idle mode and a procedure in which a terminal establishes a connection with a base station to then switch from an RRC idle mode to an RRC connected mode according to an embodiment of the disclosure.

According to an embodiment of the disclosure, if there is no transmission and reception of data to and from a terminal, which transmits and receives data in an RRC connected mode, for a certain reason or for a predetermined period of time, the base station may transmit an RRC connection release message (RRCRelease message) to the terminal, thereby switching the terminal to an RRC idle mode (2e-01). Afterwards, if the terminal that is currently disconnected (hereinafter "idle mode UE") has data required to be transmitted, the terminal may perform an RRC connection establishment process with the base station. The terminal may establish reverse transmission synchronization with the base station through a random access process, and may transmit an RRC connection request message (RRCSetupRequest message) to the base station (2e-05). The RRC connection request message may include an identifier of the terminal, a reason for establishing a connection (establishmentCause), and the like. The base station may transmit an RRC connection configuration message (RRCSetup message) such that the terminal establishes an RRC connection (2e-10). The RRC connection configuration message may include RRC connection configuration information and the like. The RRC connection is also called a "signaling radio bearer (SRB)", and is used in transmission and reception of an RRC message, which is a control messages between the terminal and the base station. The terminal having configured the RRC connection may transmit an RRC connection configuration complete message (RRCSetupComplete message) to the base station (2e-15). The message may include a service request message in which the terminal requests an AMF to configure a bearer for a predetermined service. The base station may transmit an initial terminal message containing the service request message contained in the RRC connection configuration complete message to the AMF (2e-20). The AMF may determine whether or not to provide the service requested by the terminal. If it is determined to provide the service requested by the terminal as a result of the determination, the AMF may transmit an initial UE context setup request message to the base station (2e-25). The initial UE context setup request message may include QoS (Quality of Service) information to be applied when configuring a data radio bearer (DRB), security-related information to be applied to the DRB (e.g., a security key, a security algorithm, etc.), and the like. The base station exchanges a security mode command message (SecurityModeCommand message) (2e-30) and a security mode complete message (SecurityModeComplete message) (2e-35) with the terminal in order to configure security. If the security configuration is completed, the base station may transmit, to the terminal, an RRC connection reconfiguration message (RRCReconfiguration message) (2e-40). The RRC connection reconfiguration message may include configuration information of a DRB for processing the user data, and the terminal may configure a DRB by applying the information, and may transmit an RRC connection reconfiguration complete message (RRCReconfigurationComplete message) to the base station (2e-45). The base station having completed the configuration of the DRB with the terminal may transmit an initial UE context configuration request response message (initial UE context setup response message) to the AMF (2e-50). The AMF receiving the message may perform a session management procedure with the UPF, thereby establishing a PDU session (2e-55). If the above procedure is completed, the terminal and the base station may transmit and receive data through the UPF (2e-60 and 2e-65). As described above, a general data transmission process has three stages: RRC connection configuration, security configuration, and DRB configuration. In addition, the base station may transmit RRCReconfiguration message to the terminal in order to refresh, add, or change the configuration for some reasons (2e-70).

As described above, complex signaling procedures are required in order for the terminal to establish the RRC connection and switch from an RRC idle mode to an RRC connected mode. Accordingly, an RRC inactive mode may be newly defined in the next-generation mobile communication system, and the terminal and the base station may store the context of the terminal in the new mode, and, if necessary, may maintain the S1 bearer. Therefore, if the terminal in an RRC inactive mode attempts to reconnect to the network, the terminal is able to faster access the network with fewer signalling procedures through the RRC reconnection configuration procedure proposed below.

FIG. 2F is a diagram illustrating a procedure in which a base station releases a connection of a terminal so that the terminal switches from an RRC connected mode to an RRC inactive mode and a procedure in which a terminal establishes a connection with a base station to then switch from an RRC inactive mode to an RRC connected mode according to an embodiment of the disclosure.

In FIG. 2F, the terminal 2f-01 may perform network connection with the base station 2f-02, and may transmit and receive data. If the base station needs to switch the terminal to an RRC inactive mode for some reason, the base station may send an RRC connection release message (RRCRelease message) including suspend configuration information (suspendConfig) to the terminal (2f-05) so that the terminal switches to the RRC inactive mode.

The terminal is suggested to operate as follows when receiving the RRCRelease message including suspend configuration information as described above (2f-05).

If the RRCRelease message includes suspend configuration information (suspendConfig), the terminal may apply the received suspend configuration information.

A. If there is no RAN-notification area information (ranNotificationAreaInfo) in the suspend configuration information, the terminal may apply RAN-notification area information that was previously stored. This is intended to support delta configuration to the terminal because the RAN-notification area information has a large size.

B. If there is RAN-notification area information in the suspend configuration information, the terminal may update the stored values with new RAN-notification area information included in the suspend configuration information of the RRCRelease message.

C. If there is no t380 in the suspend configuration information, the terminal may release t380 that was previously stored.

D. If there is t380 in the suspend configuration information, the terminal may store t380 included in the suspend configuration information of the RRCRelease message.

E. The terminal may store a full UE connection resume identity (FullI-RNTI), a segmented UE connection resume identity (ShortI-RNTI), NCC (nextHopChainingCount), and a RAN-paging cycle (ran-PagingCycle), which are included in the suspend configuration information.

F. In addition, the terminal may reset the MAC layer entity. This is intended to prevent unnecessary retransmission of data stored in the HARQ buffer when connection is resumed.

G. In addition, the RLC layer entities may be re-established for all SRBs and DRBs. This is intended to prevent unnecessary retransmission of data stored in the RLC buffer when connection is resumed and to initialize variables to be used later.

H. If the RRCRelease message with the suspend configuration information is received for any reason, instead of a response to the RRC connection resume request message (RRCResumeRequest message), the terminal may store a terminal context. The terminal context may include current RRC configuration information, current security context information, PDCP state information including ROHC state information, SDAP configuration information, a terminal cell identity (C-RNTI) used in a source cell (PCell), a cell identity (CellIdentity) of a source cell, and a physical cell identity.

I. In addition, the terminal may suspend all SRBs and DRBs except SRB0.

J. In addition, the terminal may drive a timer t380 using a periodic RAN notification area update timer value (PeriodicRNAU-TimerValue) included in the suspend configuration information.

K. In addition, the terminal may report suspension of the RRC connection to an upper layer.

L. In addition, the terminal may configure lower layer entities to stop integrity protection and encryption functions.

M. In addition, the terminal may switch to an RRC inactive mode.

If the driven timer t380 expires while the terminal 2f-10, having switched to the RRC inactive mode as described above, moves, or if the terminal enters a RAN-based notification area (RNA) which does not belong to the RAN-notification area information configured after the cell reselection process, receives a paging, or has data required to be transmitted to the base station, the terminal may perform the RRC connection resume procedure with the base station (2f-10).

In step 2f-10, in the case of requesting RRC connection resumption in the upper layer or requesting RRC connection resumption in the RRC, the terminal in the RRC inactive mode is suggested to operate as follows when performing a random access procedure and transmitting an RRC message to the base station (2f-15).

1. The terminal may select RRCResumeRequest1 as a message to be transmitted to the base station when field useFullResumeID is signaled in system information (SIB1). The terminal may include resumeIdentity, as a stored full UE connection resume identity value (fullI-RNTI value), in the RRCResumeRequest1 message, thereby preparing for transmission. Otherwise, the terminal may select RRCResumeRequest as a message to be transmitted to the base station. The terminal may prepare for transmission by including shortResumeIdentity, as a stored segmented UE connection resume identity value (shortI-RNTI value), in the RRCResumeRequest message.

2. The terminal may configure the reason for resuming the connection (resumeCause).

3. If the PLMN is provided from the upper layer entities or the NAS layer, the terminal may configure the PLMN selected by the upper layer entities or the NAS layer from plmn-IdentityList included in SIB1 as selectedPLMN-Identity, and may include the same in the RRCResumeRequest message or the RRCResumeRequest1 message, thereby preparing for transmission.

4. The terminal may calculate MAC-I, and may include the same in the selected message, thereby preparing for transmission.

5. The terminal may recover RRC configuration and security context information, excluding cell group configuration information (cellGroupConfig), from the stored terminal context.

6. The terminal may update a new KgNB security key, based on the current KgNB security key, a NextHop (NH) value, and a stored NCC value.

7. In addition, the terminal may derive new security keys (K_RRCenc, K_RRC_int, K_UPint, and K_UPenc) to be used in the integrity protection and verification procedures, and encryption and decryption procedures using the newly updated KgNB security key.

8. In addition, the terminal resumes the integrity protection and verification procedures by applying the updated security keys and the previously configured algorithm to all bearers except SRB0, and applies integrity verification and protection to data transmitted and received thereafter. This is intended to increase reliability and security of the data transmitted and received from and to SRB1 or DRBs thereafter.

9. In addition, the terminal resumes the encryption and decryption procedure by applying the updated security keys and the previously configured algorithm to all bearers except SRB0, and applies encryption and decryption to data transmitted and received thereafter. This is to increase reliability and security of data transmitted and received from the SRB1 or the DRBs thereafter.

10. The terminal may recover the PDCP state, and may re-establish PDCP entities for SRB1.

11. The terminal resumes SRB1. This is due to the fact that the RRCResume message is received through SRB1 in response to the RRCResumeRequset message or the RRCResumeRequest1 message to be transmitted.

12. The terminal may configure an RRCResumeRequset message or an RRCResumeRequest1 message, which is a message selected to be transmitted to the base station, and may transmit the same to lower layer entities.

13. The terminal may drive a timer T319 when transmitting the RRCResumeRequest message or the RRCResumeRequest1 message to the base station.

The terminal is suggested to operate as follows when performing the random access procedure in order to perform the RAN-based notification area update (RNA Update, RNAU) procedure e and transmitting the RRCResumeRequest message or the RRCResumeRequest1 message to the base station as described above, and then receiving an RRC connection resume message (RRCResume message) in response thereto (2f-20).

1. The terminal may stop the timer T319 driven when transmitting the RRCResumeRequest message or the RRCResumeRequest1 message to the base station.

2. If the RRCResume message includes full configuration information (fullConfig), the terminal performs a full configuration procedure. Otherwise, upon receiving the message, the terminal restores the PDCP state and resets a COUNT value for SRB2 and all DRBs. In addition, the terminal restores cell group configuration information (cellGroupConfig) from the stored terminal context. Then, the terminal notifies the lower layer entities of the same.

3. The terminal releases the full UE connection resume identity (FullI-RNTI), the segmented UE connection resume identity (ShortI-RNTI), and the stored terminal context. At this time, the RAN-notification area information (ran-NotificatioAreaInfo) is not released.

4. If the RRCResume message includes master cell group (masterCellgroup) configuration information, the terminal may perform a cell group configuration procedure according to configuration information.

5. If the message includes bearer configuration information (radioBearerConfig), the terminal may configure a bearer according to the configuration information.

6. The terminal may resume SRB2 and all DRBs.

7. The terminal discards any stored cell reselection priority information. The information may be cell reselection priority information that is stored from CellReselectionPriorities, which may be contained in the RRCRelease message, or is given by another RAT.

8. The terminal may stop the timer T320 if it is running.

9. If the RRCResume message includes frequency measurement configuration information (measConfig), the terminal may measure frequency according to the configuration information.

10. If the RRC connection is suspended, the terminal may resume the frequency measurement.

11. The terminal may switch to an RRC connected mode (2*f*-25).

12. The terminal notifies the upper layer entities of resumption of the suspended RRC connection.

13. The terminal may stop the cell reselection procedure.

14. The terminal regards the currently connected cell as a primary cell (PCell).

15. In addition, the terminal may configure an RRC connection resume complete message (RRCResumeComplete message) as follow, and may transmit the same to the lower layer entities (2*f*-30).

A. If the upper layer entities provide a NAS PDU, the NAS PDU may be included in a dedicatedNAS-Message.

B. If a PLMN is provided from the upper layer entities or the NAS layer, the PLMN selected by the upper layer entities or the NAS layer from plmn-IdentityList included in SIB1 may be configured as selectedPLMN-Identity.

FIG. 2G is a diagram illustrating a process of reselecting a cell when a terminal is in an RRC idle mode or an RRC inactive mode according to an embodiment of the disclosure.

A cell reselection process may indicate a procedure in which a terminal in an RRC idle mode or an RRC inactive mode determines whether to maintain the current serving cell or to reselect a neighbor cell when the service quality of the serving cell becomes lower than the service quality of the neighbor cell for some reasons or due to movement thereof.

In the case of handover, whether or not to perform handover may be determined by the network (MME, AMF, source eNB, or source gNB), whereas in the case of cell reselection, the terminal may determine whether or not to perform cell reselection by itself, based on the measurement quantity of the terminal. The cell to be reselected by the moving terminal may be a cell using the same NR frequency as the serving cell on which the terminal currently camps (intra-frequency), a cell using a different NR frequency therefrom (inter-frequency), or a cell using other radio access technologies (inter-RAT).

The terminal in the RRC idle mode or the RRC inactive mode (2*g*-01) may perform a series of operations while camping on the serving cell (2*g*-05).

In step 2*g*-10, the terminal in the RRC idle mode or the RRC inactive mode may receive system information broadcast by the base station of the serving cell. At this time, the terminal in the RRC idle mode or the RRC inactive mode may not receive system information broadcast by the base station in the neighbor cell. The system information may be divided into a master information block (MIB) and system information blocks (SIBs). Additionally, the system information blocks may be divided into and referred to as "SIB1" and "SI messages" (e.g., SIB2, SIB3, SIB4 or SIB5) excluding SIB1. The terminal in the RRC idle mode or the RRC inactive mode may receive and read system information (e.g., MIB, or SIB1 or SIB2) broadcast by the base station of the serving cell before camping thereon. For reference, MIB and SIB1 may be system information that is commonly applied to all terminals. SIB2 may be system information that is commonly applied when the terminal in the RRC idle mode or the RRC inactive mode reselects the intra-frequency, inter-frequency, or inter-RAT cell. SIB3, SIB4, and SIB5 may include information necessary in order for the terminal in the RRC idle mode or the RRC inactive mode to reselect a cell.

The system information block (SIB) 1 may include parameters such as a minimum reception level, minimum signal quality, a threshold, and the like, which are used when determining whether or not to measure the signal of the serving cell, and this may be cell-specific information applied to each cell. SIB2, SIB3, SIB4, and SIB5 may include information on parameters such as a minimum reception level, minimum signal quality, a threshold, and the like, which are used when determining whether or not to measure the signal of the neighbor cell. Specifically, SIB2 may include common information for reselection of the intra-frequency, inter-frequency, or inter-RAT cell, SIB3 may include information only for reselection of the intra-frequency cell, SIB4 may include information only for reselection of the inter-frequency cell, and SIB5 may include information only for reselection of the inter-RAT cell.

In step 2*g*-15, the terminal in the RRC idle mode or the RRC inactive mode may be enabled in a discontinuous reception (DRX) cycle, and may measure the reference signal received power (RSRP) ($Q_{rxlevmeas}$) and the reference signal received quality (RSRQ) ($Q_{qualmeas}$) of the serving cell (2*g*-15). The terminal is suggested to operate as follows when deriving the measurement quantity of the cell.

1. For cell selection in multi-beam operations, the measurement quantity of the cell may be derived by implementation of the terminal.

2. For cell reselection in multi-beam operations, the measurement quantity of the cell may be derived based on a plurality of beams corresponding to the same cell, based on the SSB, and one of the following methods may be used.

A. If nrofSS-BlocksToAverage or absThreshSS-Blocks-Consolidation is not present in SIB2, or if the measurement quantity of the highest beam is less than or equal to the configured absThreshSS-BlocksConsolidation, the measurement quantity of the highest beam may be derived as the measurement quantity of the cell.

B. Otherwise, the terminal may derive the measurement quantity of the cell as the linear average of the power values up to the maximum nrofSS-BlocksToAverage among the measurement quantities of the highest beam above the configured absThreshSS-BlocksConsolidation.

The terminal may calculate the reception level (Srxlev) and the reception quality (Sqaul) of the serving cell using the parameters received from SIB1 through the above measurement quantity. The terminal may compare the calculated values with thresholds, and may determine whether or not to perform measurement of the neighbor cell for cell reselection. The reception level (Srxlev) and the reception quality (Sqaul) of the serving cell may be determined using Equation 1 below.

$$Srxlev = Q_{rxlevmeas} - (Q_{rxlevmin} + Q_{rxlevminoffset}) - P_{compensation} - Qoffset_{temp}.$$

$$Squal = Q_{qualmeas} - (Q_{qualmin} + Q_{qualminoffset}) - Qoffset_{temp}.$$

Equation 1

The parameters used in Equation 1 may be defined with reference to the 3GPP standard document "38.304: User Equipment (UE) procedures in Idle mode and RRC Inactive state". This will be the same in the embodiments of the disclosure to which Equation 1 is applied below.

The terminal in the RRC idle mode or the RRC inactive mode may determine whether or not to perform measurement of neighbor cells, based on a measurement rule, instead of performing measurement of neighbor cells at all times, in order to minimize battery consumption (2g-20). At this time, the terminal in the RRC idle mode or the RRC inactive mode may not receive system information broadcast by the base station of the neighbor cell, and may perform measurement of neighbor cells using system information broadcast by the serving cell on which the terminal currently camps. If the reception level (Srxlev) and the reception quality (Squal) of the current serving cell, which are measured in step 2g-15, are less than thresholds (Srxlev<=$S_{IntraSearchP}$ and Squal<=$S_{IntraSeachQ}$), the terminal in the RRC idle mode or the RRC inactive mode may measure neighbor cells using the same frequency as the serving cell (2g-20). That is, the signal qualities (Squal) or the reception levels (Srxlev) of the neighbor cells using the same frequency as the serving cell may be derived based on SIB2 or SIB3 broadcast from the serving cell (Equation 1 is applied).

For reference, information on the thresholds $S_{IntraSearchP}$ and $S_{IntraSearchQ}$ is included in SIB2. In addition, for the inter-frequency/inter-RAT cells having higher priority than the frequency of the current serving cell, the measurement of neighbor cells may be performed regardless of the quality of the serving cell (2g-20). That is, the signal qualities (Squal) or the reception levels (Srxlev) of the inter-frequency cells having higher priority than the frequency of the serving cell may be derived based on SIB4 broadcast from the serving cell (Equation 1 is applied), and the signal qualities (Squal) or the reception levels (Srxlev) of the inter-RAT cells having higher priority than the frequency of the serving cell may be derived based on SIB5 broadcast from the serving cell (Equation 1 is applied). In addition, for the inter-frequency cells having priority equal to or lower than the frequency of the serving cell, or for the inter-RAT frequency cells having lower priority than the frequency of the serving cell, if the reception level (Srxlev) and the reception quality (Squal) of the current serving cell, which are measured in step 2g-15, are less than thresholds (Srxlex<=$S_{nonIntraSearchP}$ and Squal<=$S_{intraSearchQ}$), the terminal in the RRC idle mode or in the RRC inactive mode may measure neighbor cells using different frequencies from the serving cell or cells using different radio access technologies from the serving cell (2g-20). That is, the signal quality (Squal) or the reception level (Srxlev) of the inter-frequency cell(s) having priority lower than or equal to the frequency of the serving cell may be derived based on SIB4 broadcast from the serving cell (Equation 1 is applied), and the signal quality (Squal) or the reception level (Srxlev) of the inter-RAT cell(s) having lower priority than the frequency of the serving cell may be derived based on SIB5 broadcast from the serving cell (Equation 1 applied). For reference, information on the thresholds $S_{nonIntraSearchP}$ and $S_{nonIntraSearchQ}$ are included in SIB2.

The terminal in the RRC idle mode or the RRC inactive mode may perform a cell reselection evaluation process based on the priority (CellReselectionPriority), based on the measurement quantities (2g-20) of the neighbor cells (2g-25). That is, in the case where several cells satisfying the cell reselection criteria have different priorities, reselecting the frequency/RAT cell having higher priority is prioritized rather than reselecting the frequency/RAT cell having lower priority. Information on the priority is included in the system information (SIB1, SIB2, SIB3, SIB4, or SIB5) broadcast from the serving cell, or is included in the RRCRelease message received when switching from the RRC connected mode to the RRC idle mode or the RRC inactive mode. In the reselection evaluation process of the inter-frequency/inter-RAT cell having higher priority than the frequency of the current serving cell, the terminal may operate as follows.

First Operation:

In the case where SIB2 including a threshold of thresh-ServingLowQ is broadcast and where the terminal camps on the current serving cell for more than 1 second, if the signal quality (Squal) of the inter-frequency/inter-RAT cell is greater than a threshold $Thresh_{X,HighQ}$ during a specific time interval $Treselection_{RAT}$ (Squal>$Thresh_{X,HighQ}$), the terminal may perform reselection to the inter-frequency/inter-RAT cell.

Second Operation:

If the terminal fails to perform the first operation, the terminal may perform a second operation.

If the terminal camps on the current serving cell for more than 1 second, and if the reception level (Srxlev) of the inter-frequency/inter-RAT cell is greater than a threshold $Thresh_{X,HighP}$ during a specific time interval $Treselection_{RAT}$ (Srxlev>$Thresh_{X,HighP}$), the terminal may perform reselection to the inter-frequency/inter-RAT cell.

Here, the terminal may perform the first operation or the second operation, based on the information included in SIB4 broadcast from the serving cell, such as the signal quality (Squal) and the reception level (Srxlev) of the inter-frequency cell, the thresholds ($Threh_{X,HighQ}$ and $Thresh_{X,HighP}$), and the value $Treselection_{RAT}$. In addition, the terminal may perform the first operation or the second operation, based on the information included in SIB5 broadcast from the serving cell, such as the signal quality (Squal) and the reception level (Srxlev) of the inter-RAT cell, the thresholds ($Threh_{X,HighQ}$ and $Thresh_{X,HighP}$), and the value $Treselection_{RAT}$. For example, SIB4 may include a value $Q_{qualmin}$, a value $Q_{rxlevmin}$, or the like, and the signal quality (Squal) or the reception level (Srxlev) of the inter-frequency cell may be derived based on the same.

In addition, in the reselection evaluation process of the intra-frequency/inter-frequency cell having the same priority as the frequency of the current serving cell, the terminal may operate as follows.

Third Operation:

If the signal quality (Squal) and the reception level (Srxlev) of the intra-frequency/inter-frequency cell are greater than 0, the terminal may derive rankings of all cells that satisfy the cell selection criterion S, based on the measurement quantity (RSRP). The rankings of the serving cell and the neighbor cells may be calculated through Equation 2 below.

$$R_s = Q_{meas,s} + Q_{hyst} \qquad \text{Equation 2}$$

$$R_n = Q_{meas,n} - Q_{offset}$$

A. Here, $Q_{meas,s}$ is the measurement quantity RSRP of the serving cell, $Q_{meas,n}$ is the measurement quantity RSRP of the neighbor cell, $Q_{hyst}$ is the hysteresis value of the serving cell, and $Q_{offset}$ is the offset between the serving cell and the neighbor cell. The value $Q_{hyst}$ is included in SIB2, and this value may be commonly used for reselection of the intra-frequency/inter-frequency cell. In the case of reselection of the intra-frequency cell, $Q_{offset}$ is signaled for each cell, is applied only to the indicated cell, and is included in SIB3. In the case of reselection of the inter-frequency cell, $Q_{offset}$ is signaled for each cell, is applied only to the indicated cell, and is included in SIB4. In the case where rangetoBestCell is absent from SIB2 broadcast from the serving cell, if the ranking of the neighbor cell obtained through Equation 2 is higher than the ranking of the serving cell (R-$_n$>Rs) during a specific time interval Treselection$_{RAT}$, and if the terminal camps on the current serving cell for more than 1 second, the terminal may camp on the highest ranked cell among the neighbor cells. In the case where rangeToBestCell is present in SIB2 broadcast from the serving cell, reselection may be performed for the cell with the highest number of beams above the threshold absThreshSS-BlocksConsolidation, among the cells whose value R is within rangeToBestCell of the value R of the highest ranked cell. If a new cell satisfying the above criterion is better than the serving cell during a specific time interval Treselection$_{RAT}$, and if the terminal camps on the current serving cell for more than 1 second, reselection to the new cell may be performed.

Further, in the reselection evaluation process of the inter-frequency/inter-RAT cell having lower priority than the frequency of the current serving cell, the terminal may operate as follows.

Fourth Operation:

In the case where SIB2 including a threshold of thresh-ServingLowQ is broadcast and where the terminal camps on the current serving cell for more than 1 second, if the signal quality (Squal) of the current serving cell is less than a threshold Thresh$_{Serving,LowQ}$ (Squal<Thresh$_{Serving,LowQ}$), and if the signal quality (Squal) of the inter-frequency/inter-RAT cell is greater than a threshold Thresh$_{X,LowQ}$ during a specific time interval Treselection$_{RAT}$ (Squal>Thresh$_{X,LowQ}$), the terminal may perform reselection to the corresponding inter-frequency/inter-RAT cell.

Fifth Operation:

If the terminal fails to perform the fourth operation, the terminal may perform a fifth operation.

If the terminal camps on the current serving cell for more than 1 second, if the reception level (Srxlev) of the current serving cell is less than a threshold Thresh$_{Serving,LowP}$ (Srxlev<Thresh$_{Serving,LowP}$), and if the reception level (Srxlev) of the inter-frequency/inter-RAT cell is greater than a threshold Thresh$_{X,LowQ}$ during a specific time interval Treselection$_{RAT}$ (Srxlev>Thresh$_{X,LowP}$), the terminal may perform reselection to the corresponding inter-frequency/inter-RAT cell.

Here, the terminal may perform the fourth operation or the fifth operation on the inter-frequency cell, based on the thresholds (Thresh$_{Serving,LowQ}$ and Thresh$_{Serving,LowP}$), which are included in SIB2 broadcast from the serving cell, and the signal quality (Squal) and reception level (Srxlev) of the inter-frequency cell, the thresholds (Threh$_{X,LowQ}$ and Thresh$_{X,LowP}$), and the Treselection$_{RAT}$, which are included in SIB4 broadcast from the serving cell. The terminal may perform the fourth operation or the fifth operation on the inter-RAT cell, based on the thresholds (Thresh$_{Serving,LowQ}$ and Thresh$_{Serving,LowP}$), which are included in SIB2 broadcast from the serving cell, and the signal quality (Squal) and reception level (Srxlev) of the inter-RAT cell, the thresholds (Threh$_{X,LowQ}$ and Thresh$_{X,LowP}$), and the Treselection$_{RAT}$, which are included in SIB5 broadcast from the serving cell. For example, SIB4 may include a value $Q_{qualmin}$, a value $Q_{rxlevmin}$, or the like, and the signal quality (Squal) or the reception level (Srxlev) of the inter-frequency cell may be derived based on the same.

In step 2g-30, the terminal may receive system information (e.g., MIB and/or SIB1) broadcast from the cell before finally reselecting a candidate target cell, based on the priority in step 2g-25, and may measure the signal of the corresponding cell in order to camp thereon (2g-30).

That is, if a candidate target cell is not indicated to be barred or is not regarded as being barred, based on MIB and/or SIB1 broadcast from the corresponding cell, the terminal may derive the reception level (Srxlev) and reception quality (Squal) of the corresponding cell, based on the received SIB1, may determine whether or not the reception level (Srxlev) and the reception quality (Squal) satisfy the cell selection criterion (S-criterion) (Srxlev>0 and Squal>0), and may camp on the corresponding cell, thereby performing reselection.

FIGS. 2HA and 2HB are diagrams illustrating a process of reselecting an intra-frequency/inter-frequency cell having priority equal to the frequency of a serving cell when a terminal is in an RRC idle mode or an RRC inactive mode according to an embodiment of the disclosure.

The terminal in the RRC idle mode or the RRC inactive mode (2h-01) may camp on the serving cell (2h-05), thereby performing a series of operations.

In step 2h-10, the terminal in the RRC idle mode or the RRC inactive mode may receive system information broadcast by a base station of the serving cell. At this time, the terminal in the RRC idle mode or the RRC inactive mode may not receive system information broadcast by a base station in the neighbor cell. The system information may be divided into a master information block (MIB) and system information blocks (SIBs). Additionally, the system information blocks may be divided into and referred to as "SIB1" and "SI messages" (e.g., SIB2, SIB3, SIB4 or SIB5) excluding SIB1. The terminal in the RRC idle mode or the RRC inactive mode may receive and read system information (e.g., MIB, or SIB1 or SIB2) broadcast by the base station of the serving cell before camping thereon. For reference, MIB and SIB1 may be system information that is commonly applied to all terminals. SIB2 may be system information that is commonly applied when the terminal in the RRC idle mode or the RRC inactive mode reselects the intra-frequency, inter-frequency, or inter-RAT cell. SIB3, SIB4, and SIB5 may include information necessary in order for the terminal in the RRC idle mode or the RRC inactive mode to reselect a cell.

SIB1 may include parameters such as a minimum reception level, minimum signal quality, a threshold, and the like, which are used when determining whether or not to measure the signal of the serving cell, and this may be cell-specific information applied to each cell. SIB2, SIB3, SIB4, and SIB5 may include information on parameters such as a minimum reception level, minimum signal quality, a threshold, and the like, which are used when determining whether or not to measure the signal of the neighbor cell. Specifically, SIB2 may include common information for reselection of the intra-frequency, inter-frequency, or inter-RAT cell, SIB3 may include information only for reselection of the intra-frequency cell, SIB4 may include information only for reselection of the inter-frequency cell, and SIB5 may include information only for reselection of the inter-RAT cell.

In step 2h-15, the terminal in the RRC idle mode or the RRC inactive mode may be enabled in a discontinuous reception (DRX) cycle, and may measure the reference signal received power (RSRP) ($Q_{rxlevmeas}$) and the reference signal received quality (RSRQ) ($Q_{qualmeas}$) of the serving cell (2h-15). The terminal is suggested to operate as follows when deriving the measurement quantity of the cell.

1. For cell selection in multi-beam operations, the measurement quantity of the cell may be derived by implementation of the terminal.

2. For cell reselection in multi-beam operations, the measurement quantity of the cell may be derived based on a plurality of beams corresponding to the same cell, based on SSB, and one of the following methods may be used.

A. If nrofSS-BlocksToAverage or absThreshSS-Blocks-Consolidation is not present in SIB2, or if the measurement quantity of the highest beam is less than or equal to the configured absThreshSS-BlocksConsolidation, the measurement quantity of the highest beam may be derived as the measurement quantity of the cell.

B. Otherwise, the terminal may derive the measurement quantity of the cell as the linear average of the power values up to the maximum nrofSS-BlocksToAverage, among the measurement quantities of the highest beam above the configured absThreshSS-BlocksConsolidation.

The terminal may calculate the reception level (Srxlev) and the reception quality (Sqaul) of the serving cell using parameters received from SIB1 through the above measurement quantities. The terminal may compare the calculated values with thresholds, and may determine whether or not to perform measurement of neighbor cells for cell reselection. The reception level (Srxlev) and the reception quality (Sqaul) of the serving cell may be determined through Equation 1 described above.

The terminal in the RRC idle mode or the RRC inactive mode may determine whether or not to perform measurement of neighbor cells, based on a measurement rule, instead of performing measurement of neighbor cells at all times, in order to minimize battery consumption (2h-20). At this time, the terminal in the RRC idle mode or the RRC inactive mode may not receive system information broadcast by the base stations of the neighbor cells, and may perform measurement of neighbor cells using system information broadcast by the serving cell on which the terminal currently camps. If the reception level (Srxlev) and the reception quality (Squal) of the current serving cell, which are measured in step 2h-15, are less than thresholds (Srxlev<=$S_{IntraSearchP}$ and Squal<=$S_{IntraSeachQ}$), the terminal in the RRC idle mode or the RRC inactive mode may measure neighbor cells using the same frequency as the serving cell (2h-20). That is, the signal qualities (Squal) or the reception levels (Srxlev) of the neighbor cells using the same frequency as the serving cell may be derived based on SIB2 or SIB3 broadcast from the serving cell (Equation 1 is applied).

For reference, information on the thresholds $S_{IntraSearchP}$ and $S_{IntraSearchQ}$ is included in SIB2. In addition, for the inter-frequency/inter-RAT cells having higher priority than the frequency of the current serving cell, the measurement of neighbor cells may be performed regardless of the quality of the serving cell (2h-20). That is, the signal qualities (Squal) or the reception levels (Srxlev) of the inter-frequency cells having higher priority than the frequency of the serving cell may be derived based on SIB4 broadcast from the serving cell (Equation 1 is applied), and the signal qualities (Squal) or the reception levels (Srxlev) of the inter-RAT cells having higher priority than the frequency of the serving cell may be derived based on SIB5 broadcast from the serving cell (Equation 1 is applied). In addition, for the inter-frequency cells having priority equal to or lower than the frequency of the serving cell, or for the inter-RAT frequency cells having lower priority than the frequency of the serving cell, if the reception level (Srxlev) and the reception quality (Squal) of the current serving cell, which are measured in step 2h-15, are less than thresholds (Srxlex<=$S_{nonIntraSearchP}$ and Squal<=$S_{intraSearchQ}$), the terminal in the RRC idle mode or in the RRC inactive mode may measure neighbor cells using different frequencies from the serving cell or cells using different radio access technologies from the serving cell (2h-20). That is, the signal quality (Squal) or the reception level (Srxlev) of the inter-frequency cell(s) having priority lower than or equal to the frequency of the serving cell may be derived based on SIB4 broadcast from the serving cell (Equation 1 is applied), and the signal quality (Squal) or the reception level (Srxlev) of the inter-RAT cell(s) having lower priority than the frequency of the serving cell may be derived based on SIB5 broadcast from the serving cell (Equation 1 applied). For reference, information on the thresholds $S_{nonIntraSearchP}$ and $S_{nonIntraSearchQ}$ are included in SIB2.

The terminal in the RRC idle mode or the RRC inactive mode may perform a cell reselection evaluation process, based on priority (CellReselectionPriority), based on the measurement quantities (2h-20) of the neighbor cells (2h-25). Information on the priority is included in the system information (SIB1, SIB2, SIB3, SIB4, or SIB5) broadcast from the serving cell, or is included in the RRCRelease message received when switching from the RRC connected mode to the RRC idle mode or the RRC inactive mode.

In the reselection evaluation process of the intra-frequency/inter-frequency cell having the same priority as the frequency of the current serving cell, the terminal may operate as follows.

The terminal may perform ranking of all cells that satisfy the cell selection criterion (S-criterion) (Srxlev>0 and/or Squal>0) through Equation 1 described above (2h-25).

A. At this time, for the cells satisfying the above criterion, the terminal may perform ranking of the current serving cell and the neighbor cells through an average RSRP, based on a cell-raking criterion (R-criterion) using Equation 2 above.

The terminal may perform a cell reselection evaluation process, based on one or more of the following methods.

In the case where rangeToBestCell is absent from SIB2 broadcast from the serving cell, if the ranking of the neighbor cell obtained through Equation 2 is greater than the ranking of the serving cell during a specific time interval $Treselection_{RAT}$ ($R_n$>$R_s$), and if the terminal camps on the current serving cell for more than 1 second, the terminal may reselect the highest ranked cell from among the neighbor cells (2h-30).

In the case where rangeToBestCell is present in SIB2 broadcast from the serving cell and where nrofSS-BlocksToAverage is absent from SIB2 and/or SIB4 broadcast from the serving cell, if the ranking of the neighbor cell obtained through Equation 2 is greater than the ranking of the serving cell during a specific time interval $Treselection_{RAT}$ ($R_n$>$R_s$), and if the terminal camps on the current serving cell for more than 1 second, the terminal may camp on the highest ranked cell among the neighbor cells (2h-35).

In the case where rangeToBestCell is present in SIB2 broadcast from the serving cell and where nrofSSBlocksToAverage is present in SIB2 and/or SIB4 broadcast from the serving cell, if there are cells in which the number of beams above absThreshSSBlocksConsolidation is larger than nrofSS-BlocksToAverage, among the cells whose value R is within rangeToBestCell of the value R of the highest ranked cell, if the ranking of the neighbor cell obtained through Equation 2 is greater than the ranking of the serving cell during a specific time interval Treselection$_{RAT}$ ($R_n$>$R_s$), and if the terminal camps on the current serving cell for more than 1 second, the terminal may camp on the highest ranked cell among the neighbor cells (2h-40).

If rangeToBestCell is present in SIB2 broadcast from the serving cell, the terminal may perform reselection to the cell with the highest ratio of the number of beams above the threshold abs ThreshSS-BlocksConsolidation to the total number of beams for each cell, among the cells whose value R is within rangeToBestCell of the value R of the highest ranked cell. At this time, if the new cell to be reselected is better than the serving cell during a specific time interval Treselection$_{RAT}$, and if the terminal camps on the current serving cell for more than 1 second, the terminal may perform reselection to the new cell (2h-45).

In step 2h-50, the terminal may receive system information (e.g., MIB and/or SIB1) broadcast from a candidate target cell before finally reselecting the corresponding cell, and may measure the signal of the corresponding cell in order to camp thereon. That is, if a candidate target cell is not indicated to be barred or is not regarded as being barred, based on MIB and/or SIB1 broadcast from the corresponding cell, the terminal may derive the reception level (Srxlev) and reception quality (Squal) of the corresponding cell, based on the received SIB1, may determine whether or not the reception level (Srxlev) and the reception quality (Squal) satisfy the cell selection criterion (S-criterion) (Srxlev>0 and Squal>0), and may camp on the corresponding cell, thereby performing reselection.

Figure 2I:
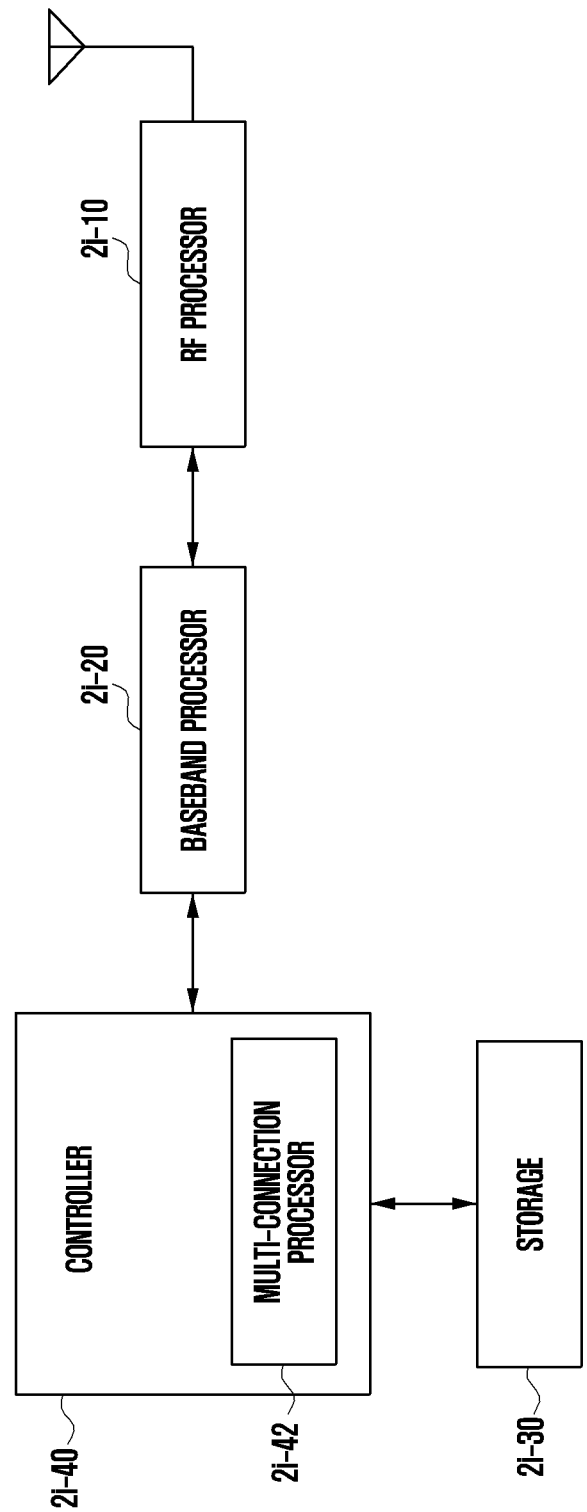
FIG. 2I is a block diagram illustrating an internal structure of a terminal according to an embodiment of the disclosure.

FIG. 2I is a block diagram illustrating an internal structure of a terminal according to an embodiment of the disclosure.

Referring to the drawing, a terminal includes a radio frequency (RF) processor 2i-10, a baseband processor 2i-20, a storage 2i-30, and a controller 2i-40.

The RF processor 2i-10 performs a function of transmitting and receiving a signal through a radio channel, such as band conversion and amplification of a signal. That is, the RF processor 2i-10 up-converts a baseband signal provided from the baseband processor 2i-20 to an RF band signal to thus transmit the same through an antenna, and down-converts an RF band signal received through the antenna to a baseband signal. For example, the RF processor 2i-10 may include a transmission filter, a reception filter, an amplifier, a mixer, an oscillator, a digital-to-analog converter (DAC), an analog-to-digital converter (ADC), and the like. Although only one antenna is illustrated in FIG. 2i, the terminal may have a plurality of antennas. In addition, the RF processor 2i-10 may include a plurality of RF chains. Further, the RF processor 2i-10 may perform beamforming. To perform beamforming, the RF processor 2i-10 may adjust the phases and magnitudes of signals transmitted and received through a plurality of antennas or antenna elements. In addition, the RF processor may perform MIMO, and may receive a plurality of layers when performing MIMO.

The baseband processor 2i-20 performs a function of conversion between a baseband signal and a bit string according to the physical layer specification of the system. For example, when transmitting data, the baseband processor 2i-20 encodes and modulates transmission bit strings, thereby generating complex symbols. In addition, upon receiving data, the baseband processor 2i-20 demodulates and decodes a baseband signal provided from the RF processor 2i-10 to thus recover reception bit strings. For example, in the case where an orthogonal frequency division multiplexing (OFDM) scheme is applied, when transmitting data, the baseband processor 2i-20 generates complex symbols by encoding and modulating transmission bit strings, maps the complex symbols to subcarriers, and then configures OFDM symbols through an inverse fast Fourier transform (IFFT) operation and cyclic prefix (CP) insertion. In addition, when receiving data, the baseband processor 2i-20 divides the baseband signal provided from the RF processor 2i-10 into OFDM symbol units, restores the signals mapped to the subcarriers through a fast Fourier transform (FFT) operation, and then restores reception bit strings through demodulation and decoding.

The baseband processor 2i-20 and the RF processor 2i-10 transmit and receive signals as described above. Accordingly, the baseband processor 2i-20 and the RF processor 2i-10 may be referred to as a "transmitter", a "receiver", a "transceiver", or a "communication unit". Further, at least one of the baseband processor 2i-20 and the RF processor 2i-10 may include a plurality of communication modules to support a plurality of different radio access techniques. In addition, at least one of the baseband processor 2i-20 and the RF processor 2i-10 may include different communication modules to process signals of different frequency bands. For example, the different radio access techniques may include a wireless LAN (e.g., IEEE 802.11), a cellular network (e.g., LTE), and the like. The different frequency bands may include super-high frequency (SHF) (e.g., 2.NRHz or NRhz) bands and millimeter wave (e.g., 60 GHz) bands.

The storage 2i-30 stores data such as basic programs, application programs, configuration information, and the like for the operation of the terminal. In particular, the storage 2i-30 may store information related to a second access node for performing wireless communication using a second radio access technique. In addition, the storage 2i-30 provides the stored data in response to a request from the controller 2i-40.

The controller 2i-40 controls the overall operation of the terminal. For example, the controller 2i-40 transmits and receives signals through the baseband processor 2i-20 and the RF processor 2i-10. In addition, the controller 2i-40 records and reads data in and from the storage 2i-40. To this end, the controller 2i-40 may include at least one processor. For example, the controller 2i-40 may include a communication processor (CP) for controlling communication and an application processor (AP) for controlling upper layers such as application programs and the like.

Figure 2J:
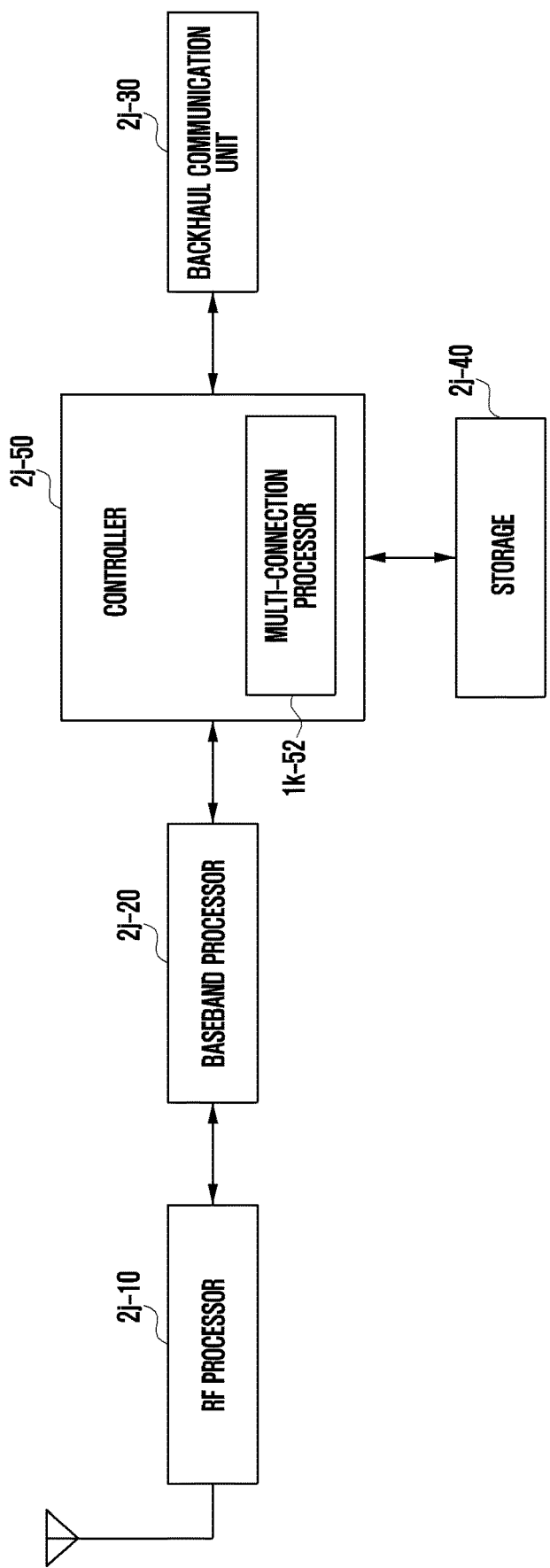
FIG. 2J is a block diagram illustrating the configuration of an NR base station according to an embodiment of the disclosure.

FIG. 2J is a block diagram illustrating the configuration of an NR base station according to an embodiment of the disclosure.

As shown in the drawing, the base station includes an RF processor 2j-10, a baseband processor 2j-20, a backhaul communication unit 2j-30, a storage 2j-40, and a controller 2j-50.

The RF processor 2j-10 performs a function of transmitting and receiving signals through a radio channel, such as band conversion and amplification of a signal and the like. That is, the RF processor 2j-10 up-converts a baseband signal provided from the baseband processor 2j-20 to an RF band signal, to thus transmit the same through an antenna, and down-converts an RF band signal received through the antenna to a baseband signal. For example, the RF processor 2j-10 may include a transmission filter, a reception filter, an amplifier, a mixer, an oscillator, a DAC, an ADC, and the like. Although only one antenna is shown in the drawing, the first access node may have a plurality of antennas. In addition, the RF processor 2j-10 may include a plurality of RF chains. Further, the RF processor 2j-10 may perform beamforming. To perform beamforming, the RF processor 2j-10 may adjust the phases and magnitudes of signals transmitted and received through a plurality of antennas or antenna elements. The RF processor may perform a downlink MIMO operation by transmitting one or more layers.

The baseband processor 2j-20 performs a function of conversion between a baseband signal and a bit string according to a physical layer specification of a first radio access technique. For example, when transmitting data, the baseband processor 2j-20 encodes and modulates transmission bit strings, thereby generating complex symbols. In addition, upon receiving data, the baseband processor 2j-20 demodulates and decodes a baseband signal provided from the RF processor 2j-10 to thus recover reception bit strings. For example, in the case where an OFDM scheme is applied, when transmitting data, the baseband processor 2j-20 generates complex symbols by encoding and modulating transmission bit strings, maps the complex symbols to subcarriers, and then configures OFDM symbols through the IFFT operation and CP insertion. In addition, when receiving data, the baseband processor 2j-20 divides the baseband signal provided from the RF processor 2j-10 into OFDM symbol units, restores the signals mapped to the subcarriers through the FFT operation, and then restores reception bit strings through demodulation and decoding. The baseband processor 2j-20 and the RF processor 2j-10 transmit and receive signals as described above. Accordingly, the baseband processor 2j-20 and the RF processor 2j-10 may be referred to as a "transmitter", a "receiver", a "transceiver", a "communication unit", or a "radio communication unit".

The backhaul communication unit 2j-30 provides an interface for performing communication with other nodes in the network. That is, the backhaul communication unit 2j-30 converts a bit string, transmitted from the primary base station to another node, such as a secondary base station, a core network, or the like, into a physical signal, and converts physical signals received from other nodes into bit strings.

The storage 2j-40 stores data such as basic programs, application programs, configuration information, and the like for the operation of the primary base station. In particular, the storage 2j-40 may store information about bearers allocated to a connected terminal, a measurement result reported from a connected terminal, and the like. In addition, the storage 2j-40 may store information that is a criterion for determining whether multiple connections are provided to the terminal or are released. In addition, the storage 2j-40 provides the stored data in response to a request from the controller 2j-50.

The controller 2j-50 controls the overall operation of the primary base station. For example, the controller 2j-50 transmits and receives signals through the baseband processor 2j-20 and the RF processor 2j-10 or the backhaul communication unit 2j-30. In addition, the controller 2j-50 records and reads data in and from the storage 2j-40. To this end, the controller 2j-50 may include at least one processor.

What is claimed is:

1. A method performed by a user equipment (UE) in a wireless communication system, the method comprising:
   receiving, from a base station, system information comprising information on a cell reselection and a threshold associated with a synchronization signal block (SSB);
   identifying a first ratio of a number of beams above the threshold to a total number of beams associated with a serving cell based on the information, wherein the serving cell has a same cell reselection priority as a neighbor cell;
   identifying a second ratio of a number of beams above the threshold to a total number of beams associated with the neighbor cell based on the information, wherein the total number of beams associated with the neighbor cell is different from the total number of beams associated with the serving cell; and
   selecting a target cell with a highest ratio between the first ratio and the second ratio in case that the information is configured.

2. A user equipment (UE), comprising:
   a transceiver; and
   a controller operably coupled to the transceiver and configured to:
   receive, from a base station, system information comprising information on a cell reselection and a threshold associated with a synchronization signal block (SSB),
   identify a first ratio of a number of beams above the threshold to a total number of beams associated with a serving cell based on the information, wherein the serving cell has a same cell reselection priority as a neighbor cell,
   identify a second ratio of a number of beams above the threshold to a total number of beams associated with the neighbor cell based on the information, wherein the total number of beams associated with the neighbor cell is different from the total number of beams associated with the serving cell, and
   select a target cell with a highest ratio between the first ratio and the second ratio in case that the information is configured.

* * * * *